(12) United States Patent
Weaver

(10) Patent No.: US 9,179,384 B2
(45) Date of Patent: Nov. 3, 2015

(54) MOBILITY ROBUSTNESS OPTIMIZATION BASED ON REFERENCE SIGNAL STRENGTH MAPS

(71) Applicant: Carl F. Weaver, Morris Plains, NJ (US)

(72) Inventor: Carl F. Weaver, Morris Plains, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 209 days.

(21) Appl. No.: 13/731,183

(22) Filed: Dec. 31, 2012

(65) Prior Publication Data

US 2014/0087739 A1    Mar. 27, 2014

Related U.S. Application Data

(60) Provisional application No. 61/705,887, filed on Sep. 26, 2012.

(51) Int. Cl.
*H04W 36/16* (2009.01)
*H04W 16/18* (2009.01)
*H04W 24/02* (2009.01)
*H04W 36/00* (2009.01)

(52) U.S. Cl.
CPC ............ *H04W 36/165* (2013.01); *H04W 16/18* (2013.01); *H04W 24/02* (2013.01); *H04W 36/0083* (2013.01)

(58) Field of Classification Search
CPC .............. H04W 16/18; H04W 36/165; H04W 36/0083
USPC .................................................. 455/441, 436
See application file for complete search history.

(56) References Cited

U.S. PATENT DOCUMENTS

| 6,507,740 | B2* | 1/2003 | Shi ................................ 455/437 |
| 6,745,034 | B2* | 6/2004 | Wang et al. ................... 455/441 |
| 6,782,261 | B1* | 8/2004 | Ahmed et al. ................ 455/436 |
| 8,565,753 | B2* | 10/2013 | Hamabe et al. ............... 455/423 |

(Continued)

FOREIGN PATENT DOCUMENTS

GB            2 485 588 A        5/2012

OTHER PUBLICATIONS

International Search Report and Written Opinion for International Patent Application Serial No. PCT/US2013/059676, mailed Nov. 21, 2013, consists of 12 unnumbered pages.
Wang, S. S., et al., "Adaptive Soft Handoff Method Using Mobile Location Information," *IEEE 55th Vehicular Technology Conference*, Birmingham, AL, May 6-9, 2002, pp. 1936-1940, vol. 4, No. 6, XP 010622154, New York, NY.

(Continued)

*Primary Examiner* — Jinsong Hu
*Assistant Examiner* — Jean Chang
(74) *Attorney, Agent, or Firm* — Wall & Tong, LLC

(57) ABSTRACT

A map-based mobility robustness optimization (MRO) capability is provided for improving one or more aspects related to mobility in a wireless communication network. The map-based MRO capability may use one or more reference signal strength map associated with a wireless network to determine at least one management function for the wireless network. The at least one management function may include determining at least one configuration action adapted to satisfy a handover failure rate for the wireless network based on the one or more reference signal strength maps, preventing handover race conditions in a cluster of wireless cells covered by the one or more reference signal strength maps, or the like. The one or more management functions may be adapted to improve or optimize one or more of handover failure rate, prevention of handover race conditions, or the like.

21 Claims, 13 Drawing Sheets

(56) References Cited

U.S. PATENT DOCUMENTS

| | | | |
|---|---|---|---|
| 2002/0082012 A1* | 6/2002 | Wang et al. | 455/435 |
| 2004/0058678 A1* | 3/2004 | deTorbal | 455/437 |
| 2006/0126556 A1* | 6/2006 | Jiang et al. | 370/328 |
| 2008/0096566 A1* | 4/2008 | Brunner et al. | 455/437 |
| 2009/0191878 A1* | 7/2009 | Hedqvist et al. | 455/441 |
| 2010/0226339 A1* | 9/2010 | Stephenson et al. | 370/332 |
| 2010/0298001 A1* | 11/2010 | Dimou et al. | 455/441 |
| 2011/0170520 A1* | 7/2011 | Kezys | 370/331 |
| 2012/0083281 A1* | 4/2012 | Watanabe et al. | 455/446 |
| 2012/0088507 A1* | 4/2012 | Legg et al. | 455/436 |
| 2012/0120918 A1* | 5/2012 | Kezys | 370/331 |
| 2012/0127876 A1* | 5/2012 | Hunukumbure et al. | 370/252 |
| 2012/0157105 A1* | 6/2012 | Grob-Lipski | 455/437 |
| 2013/0150054 A1* | 6/2013 | Axmon et al. | 455/440 |
| 2013/0244664 A1* | 9/2013 | Song et al. | 455/437 |
| 2014/0087729 A1* | 3/2014 | Olofsson et al. | 455/436 |

OTHER PUBLICATIONS

Cortes-Rodriguez F., et al., "Position Location Assisted Multi-Valued Logic Handoff Algorithm," Vehicular Technology Conference, Amsterdam, Netherlands, 1999, Sep. 19-22, 1999, pp. 775-779, vol. 2, No. 19, XP010353097, Piscataway, NJ.

NTT Docomo, et al., "Event Triggered Logged MDT Measurement," $3^{rd}$ Generation Partnership Project (3GPP), Mobile Competence Centre, Aug. 17, 2010, vol. RAN WG2, XP050451918, Madrid, Spain.

3GPP TS 36.331, Version 11.0.0, $3^{rd}$ Generation Partnership Project; Technical Specification Group Radio Access Network; Evolved Universal Terrestrial Radio Access (E-UTRA); Radio Resource Control (RRC); Protocol specification (Release 11), Jun. 2012.

\* cited by examiner

```
                              Macro Cell #
            1  2  3  4  5  6  7  8  9 10 11 12 13 14 15 16 17 18 19 20 21
   Pico
    #       Biases (dB) for 50m Eff Radius and Race-Free
   24  16   0 15 14  0  0 14  6  0  5 15  0  0 15 15  0  0 13  8  0  1
   23   0   8  0  8  0  0  0  0  0  0  4  0  0  8  0  0  0  8  1  0  3
   22   2   0 14 13  0  0 12  3  0  0 13  0  0  2 13  0  0  1  0  0  4
```

MOBILITY ROBUSTNESS OPTIMIZATION BASED ON REFERENCE SIGNAL STRENGTH MAPS

CROSS REFERENCE TO RELATED APPLICATION

This application claims the benefit of U.S. Provisional Patent Application Ser. No. 61/705,887, entitled "MOBILITY ROBUSTNESS OPTIMIZATION BASED ON REFERENCE SIGNAL STRENGTH MAPS," filed Sep. 26, 2012, which is hereby incorporated herein by reference in its entirety.

TECHNICAL FIELD

The disclosure relates generally to providing mobility robustness optimization in wireless communication networks and, more specifically but not exclusively, to improving handovers in wireless communication networks.

BACKGROUND

There is a need for improved mobility robustness in wireless communication networks.

SUMMARY OF EMBODIMENTS

Various deficiencies in the prior art are addressed by embodiments for improving handovers in a wireless communication network.

In one embodiment, an apparatus includes a processor and a memory communicatively connected to the processor, where the processor is configured to receive at least one reference signal strength map associated with a wireless network and determine at least one management function for the wireless network based on the at least one reference signal strength map.

In one embodiment, a computer-readable storage medium stores instructions which, when executed by a computer, cause the computer to perform a method including receiving at least one reference signal strength map associated with a wireless network and determining at least one management function for the wireless network based on the at least one reference signal strength map.

In one embodiment, a method includes using a processor for receiving at least one reference signal strength map associated with a wireless network and determining at least one management function for the wireless network based on the at least one reference signal strength map.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EMBODIMENTS

Figure 1:
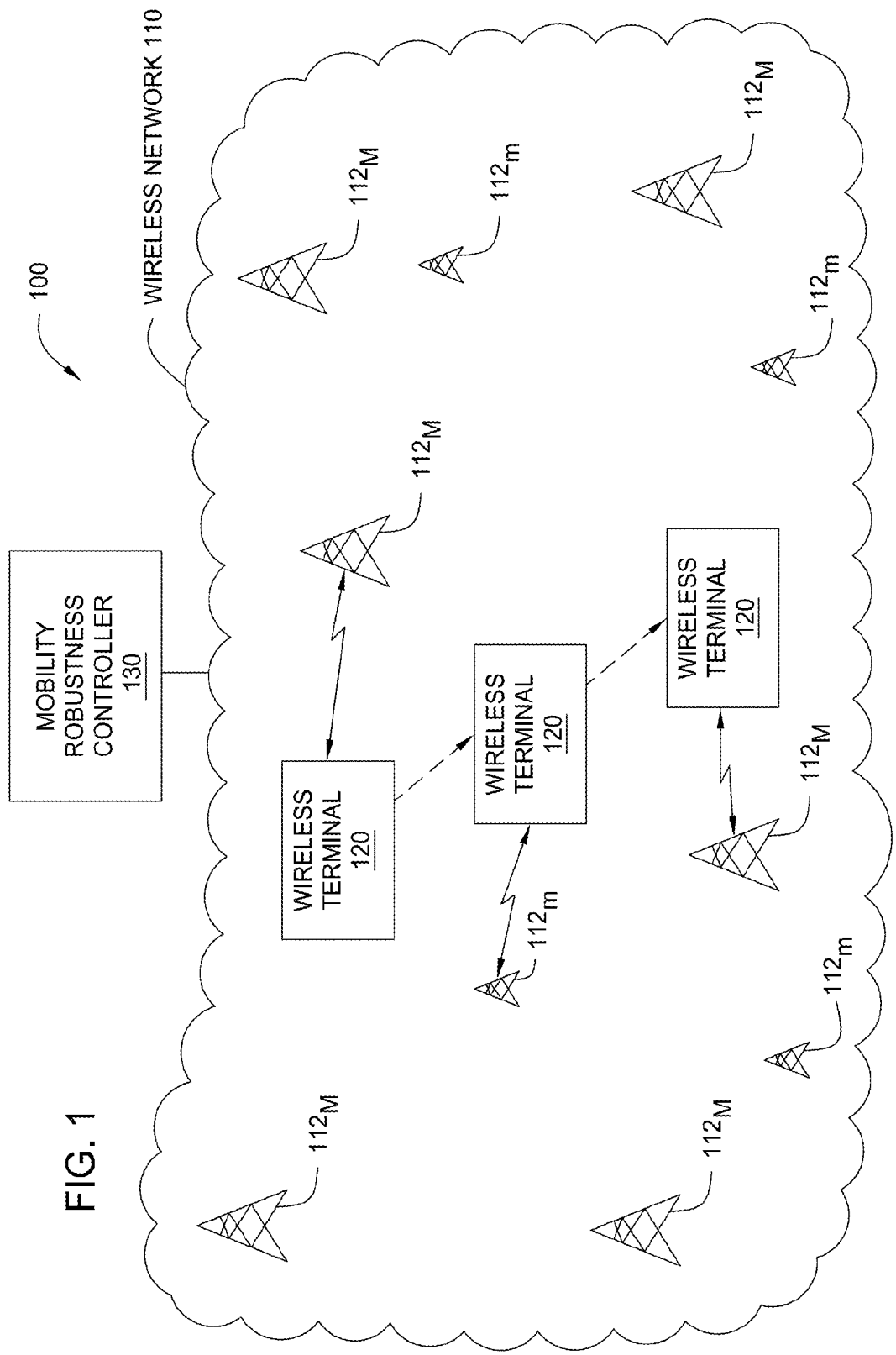
FIG. 1 depicts an exemplary wireless communication system including wireless access devices.

In general, a map-based mobility robustness optimization (MRO) capability is provided for improving or optimizing one or more aspects related to mobility in a wireless communication network. The map-based MRO capability may be adapted to improve or optimize one or more aspects related to mobility in a wireless communication network based on reference signal strength information associated with one or more reference signal strength maps associated with the wireless communication network.

In at least some embodiments, the map-based MRO capability is adapted for use for a wireless communication network supporting handovers of wireless terminals between wireless access points of the wireless communication network. The wireless terminals may be wireless user terminals or any other suitable types of wireless terminals capable of communicating wirelessly via wireless access points. The wireless access points may include cellular-based base stations or any other suitable types of wireless access points. The wireless communication network may be a Third Generation (3G) wireless network (e.g., an Evolution Data-Optimized (EV-DO) network, a Universal Mobile Telecommunications System (UMTS) network, or the like), a Fourth Generation (4G) wireless network (e.g., a Long Term Evolution (LTE) or the like), or the like, as well as various combinations thereof. The base stations may include macro base stations (e.g., NodeBs, eNodeBs, or the like). The base stations also may include one or more micro base stations (e.g., pico cells, femto cells, or the like). Thus, it is noted that, although primarily depicted and described with respect to use of the map-based MRO capability for a wireless network including LTE-based eNodeBs as well as pico cells adapted to provide additional coverage within the vicinity of the LTE-based eNodeBs, the map-based MRO capability may be used for wireless networks supporting various other types of wireless technologies and including various other types of base stations.

In at least some embodiments, the map-based MRO capability may utilize one or more reference signal strength maps to provide one or more management functions associated with a wireless communication network (e.g., determining at least one configuration action adapted to satisfy a handover failure rate for the wireless network based on the one or more reference signal strength maps, preventing handover race conditions in a cluster of wireless cells covered by the one or more reference signal strength maps, or the like, as well as various combinations thereof). The one or more management functions may be adapted to improve or optimize one or more aspects related to mobility in a wireless communication network (e.g., improving or optimizing handover failure rate, improving or optimizing prevention of handover race conditions, or the like).

It will be appreciated that the map-based MRO capability, although primarily depicted and described herein within the context of specific types of wireless networks (e.g., wireless networks supporting specific types of wireless technology, specific types of wireless network elements, specific types of wireless network functions, or the like), may be provided within various other types of wireless networks (e.g., wireless networks supporting other types of wireless technology, other types of wireless network elements, other types of wireless network functions, or the like).

FIG. 1 depicts an exemplary wireless communication system including wireless access points.

As depicted in FIG. 1, the wireless communication system 100 includes a wireless network 110 supporting wireless communications of a wireless terminal 120 (as well as other wireless terminals which have been omitted for purposes of clarity).

The wireless network 110 may be any suitable type of wireless network supporting handovers between base stations (e.g., a UMTS network, an EV-DO network, an LTE network, a network including a combination of macro base stations and smaller base stations (e.g., pico cells or femto cells), a network composed of smaller base stations, or the like, as well as various combinations thereof.

The wireless network 110 includes a plurality of base stations 112, including a plurality of macro base stations $112_M$ and a plurality of micro base stations $112_m$. The macro base stations $112_M$ may include EV-DO base stations when wireless network 110 is an EV-DO-based network, UMTS NodeBs when wireless network 110 is a UMTS-based network, eNodeBs when wireless network 110 is an LTE network, or the like, as well as various combinations thereof. The micro base stations $112_m$ may include pico cells, femto cells, or the like, as well as various combinations thereof.

The wireless network 110 may be configured to support handovers of the wireless terminal 120 between base stations 112, which may include handovers between macro base stations $112_m$, handovers between micro base stations $112_m$, or handovers between macro base stations $112_m$ and micro base stations $112_m$. The wireless network 110 may support handovers of the wireless terminal 120 between base stations 112 as the wireless terminal 120 moves between locations (e.g., while a user of the wireless terminal 120 is walking or traveling via a vehicle with wireless terminal 120, as the wireless terminal 120 moves, or the like). It will be appreciated that, although depicted and described with respect to specific types, numbers, and arrangements of base stations 112 in wireless network 110, any other suitable types, numbers, or arrangements of base stations 112 may be used in wireless network 110 (e.g., only macro base stations $112_M$, only micro base stations $112_m$, fewer or more base stations 112, base stations 112 deployed at different geographic locations with respect to each other, or the like, as well as various combinations thereof). It will be appreciated that the base stations 112 may form part of one or more Radio Access Networks (RANs) supporting one or more wireless access technologies.

The wireless terminal 120 may be any type of wireless terminal configured to communicate via a wireless communication network such as wireless network 110. For example, the wireless terminal 120 may be a wireless user terminal (e.g., a laptop computer, a tablet computer, a smart phone, a cellular phone, or the like) or any other type of wireless terminal (e.g., even a device not typically operated by a user, such as a sensor or other device which may be configured to communicate wirelessly without interaction by an associated end user). As depicted in FIG. 1, as the wireless terminal 120 moves between geographic locations the wireless terminal 120 may be served by different ones of the base stations 112, which may include handovers between the base stations 112. The manner in which a handover of wireless terminal 120 between base stations 112 may be performed will be understood by one skilled in the art.

As further depicted in FIG. 1, the wireless communication system 100 also includes a mobility robustness controller 130.

The mobility robustness controller 130 may be configured to provide various functions depicted and described herein. The mobility robustness controller 130 may be configured to provide one or more management functions for wireless communication system 100. The mobility robustness controller 130 may be configured to provide one or more management functions for wireless network 110 based on reference signal strength information associated with wireless network 110. The mobility robustness controller 130 may be configured to provide one or more management functions for wireless network 110 based on one or more reference signal strength maps associated with wireless network 110. The one or more management functions may include determining at least one configuration action adapted to satisfy a handover failure rate based on the one or more reference signal strength maps, preventing handover race conditions based on the one or more reference signal strength maps, or the like, as well as various combinations thereof. The one or more management functions may be adapted to improve or optimize one or more aspects related to mobility in a wireless communication network (e.g., improving or optimizing handover failure rate, improving or optimizing prevention of handover race conditions, or the like). The mobility robustness controller 130 may be configured to provide one or more management functions for a wireless network that is being planned and has not yet been deployed (e.g., for determining whether or not to deploy the proposed wireless network, for determining an optimal or suitable configuration for the proposed wireless network, or the like), an existing wireless network that has been deployed is operating to support end user communications, or the like, as well as various combinations thereof.

In at least some embodiments, mobility robustness controller 130 is communicatively connected to wireless network 110 such that mobility robustness controller 130 may communicate with wireless network 110. For example, mobility robustness controller 130 may communicate with wireless network 110 for retrieving information from base stations 112 of wireless network 110 (e.g., reference signal strength information, reference signal strength map information, or the like), for providing configuration information for configuring one or more base stations 112 of wireless network 110 (e.g., a configuration action(s) determined by mobility robustness controller 130 to be adapted to satisfy a handover failure rate within wireless network 110, a configuration action(s) determined by mobility robustness controller 130 to be adapted to prevent a handover race condition, or the like, as well as various combinations thereof. In at least some such embodiments, mobility robustness controller 130 may be implemented as part of an existing system (e.g., an existing management system in communication with wireless network 110, as a new system (e.g., a new management system in communication with wireless network 110), or the like, as well as various combinations thereof. For example, mobility robustness controller 130 may be implemented as part of an Element Management System (EMS), a Network Management System (NMS), an Operation, Administration, & Maintenance (OA&M) system, a configuration system, a control system, or the like.

In at least some embodiments, mobility robustness controller 130 is not communicatively connected to wireless network 110. For example, mobility robustness controller 130 may be implemented as part of an existing Radio Network Planning (RNP) tool, as a new RNP tool, as another type of tool, or the like. In at least some such embodiments, mobility robustness controller 130 may be communicatively connected to one or more devices or networks (e.g., one or more management systems including reference signal strength information). In at least some such embodiments, mobility robustness controller may be a standalone system that is not communicatively connected to any other devices or networks.

The functions of the mobility robustness controller 130 may be centralized or distributed across one or more existing or new elements or devices.

In at least some embodiments, reference signal strength information associated with a wireless network (e.g., wireless network 110 or any other suitable type of wireless network) may be used to determine at least one management function for the wireless network. The reference signal strength information may be provided in the form of one or more reference signal strength maps (or information indicative of one or more reference signal strength maps). The reference signal strength maps may be obtained from any suitable source of such information. For example, reference signal strength maps may be obtained from service measurement data from the wireless network, data from a Radio Network Planning (RNP) tool, data from one or more simulations, or the like, as well as various combinations thereof. It is noted that reference signal strength maps may be referred to using various names depending upon the underlying technology of the associated wireless network. For example, in the case of an LTE network, the reference signal strength maps are referred to as Reference Signal Receive Power (RSRP) maps. In at least some embodiments, a reference signal strength map may be defined as an array of (cell, xDim, yDim) two-dimensional pixels by the number of cells. An exemplary reference signal strength map is depicted and described with respect to FIG. 2.

Figure 2:
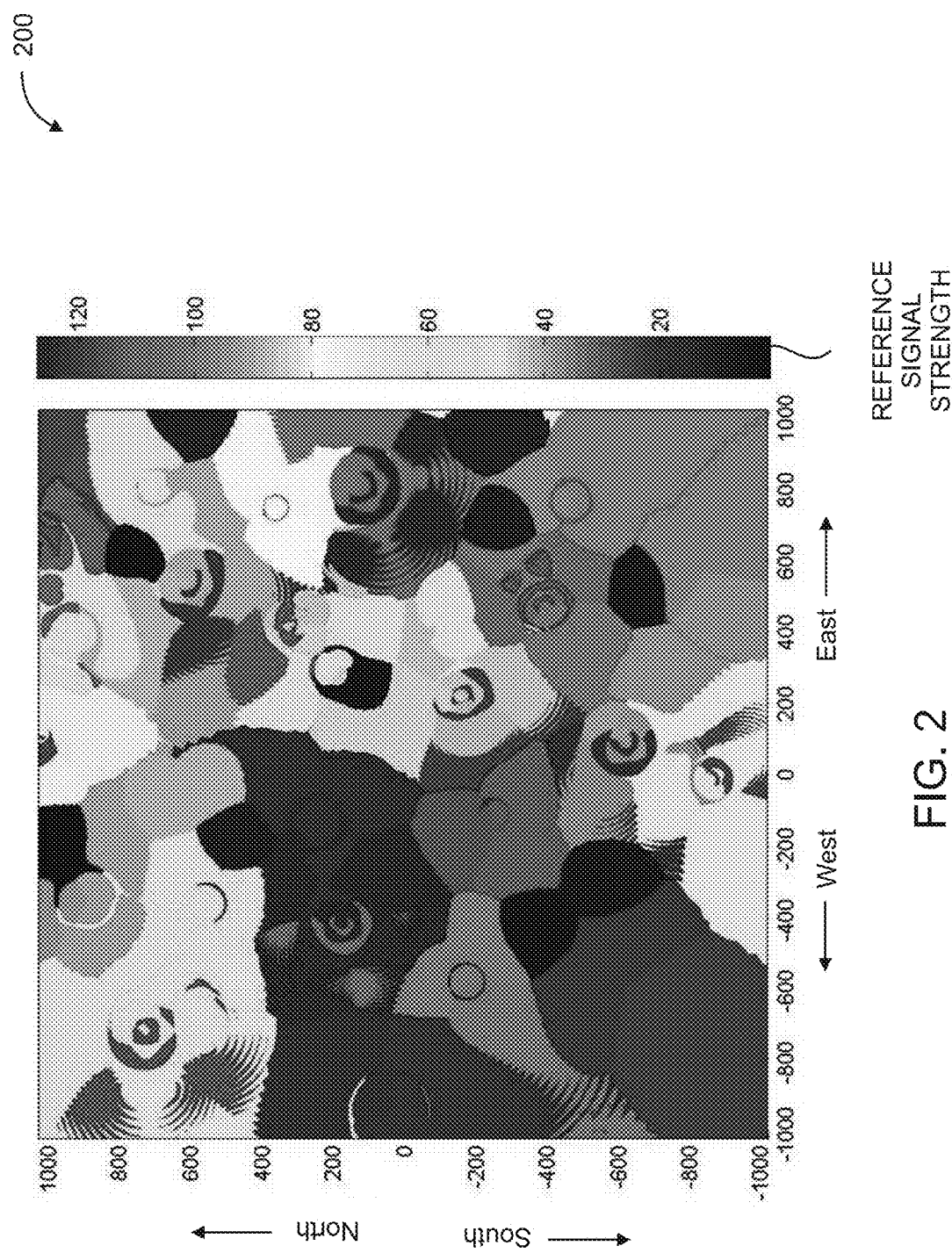
FIG. 2 depicts an exemplary reference signal strength map for a portion of a wireless network.

FIG. 2 depicts an exemplary reference signal strength map for a portion of a wireless network. As depicted in FIG. 2, exemplary reference signal strength map 200 indicates signal strength measurements at geographic locations covered by a set of base stations. The set of base stations, similar to wireless network 110 of FIG. 1, includes macro base stations and micro base stations (illustratively, ten micro base stations). The exemplary reference signal strength map 200 assumes a 6 dB 2×2 combining gain and uses Cost Hata at a 2 m resolution. It is noted that the small circular rings of best server change are at the null between the main vertical lobe of the antenna pattern and the first lower side-lobe. In case of four-sector nodes, both the first and second side-lobes are coming into play. It is noted that the alternating rings of best server status on the four-sector macro base stations are likely quantization artifacts due to different centering of origin (e.g., (x,y) antenna location) for path loss calculation. It is noted that, due to the large number of cells in this cluster and the consecutive numbering for co-located cells, the color distance between co-located cells is not discernible in some cases. The ten micro base stations may be identified, in most cases, by absence of vertical pattern side-lobes.

In at least some embodiments, reference signal strength information associated with wireless network 110 may be used to determine at least one configuration action for wireless network 110. In at least some embodiments, at least one reference signal strength map may be used to determine at least one configuration action adapted to satisfy a handover failure rate (HOFR). The at least one reference signal strength map may be used to determine at least one configuration action adapted to satisfy a handover failure rate (HOFR) for wireless network 110 or a portion of wireless network 110 (e.g., an individual base station 112, a pair of base stations 112, a set or cluster of base stations 112, or the like, as well as various combinations thereof).

The determination of at least one configuration action adapted to satisfy a HOFR based on at least one reference signal strength map may include determining distance margin information based on the at least one reference signal strength map, determining a handover time constraint based on the distance margin information and speed information, and determining the at least one configuration action based on the handover time constraint.

The distance margin information may include a handover distance margin distribution, a handover distance margin map (e.g., mapped based on geographic location), or the like, as well as various combinations thereof. An exemplary handover distance margin distribution is depicted and described with respect to FIG. 3 and an exemplary handover distance margin map is depicted and described with respect to FIG. 4.

Figure 3:
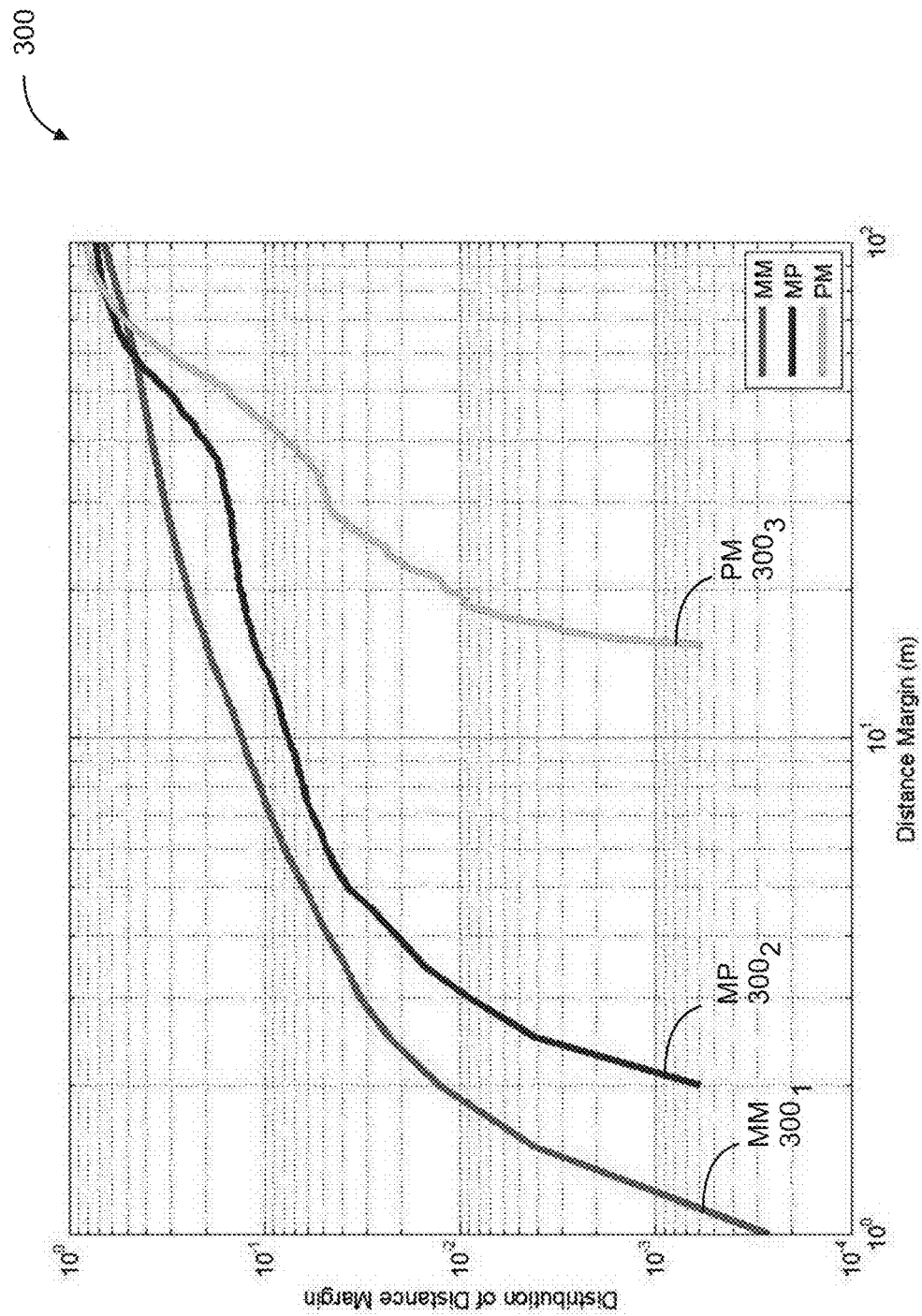
FIG. 3 depicts exemplary handover distance margin distributions for the reference signal strength map of FIG. 2.

FIG. 3 depicts exemplary handover distance margin distributions for the reference signal strength map of FIG. 2. The exemplary handover distance margin distributions 300 include a first handover distance margin distribution $300_1$ for macro-to-macro (MM) handovers, a second handover distance margin distribution $300_2$ for macro-to-pico (MP) handovers, and a third handover distance margin distribution $300_3$ for pico-to-macro (PM) handovers. It is noted that although primarily depicted and described with respect to embodiments in which the handover distance margin distributions are associated with handovers between macro base stations and a specific type of micro base station (namely, pico base stations), handover distance margin distributions may be obtained for handovers between macro base stations and any other suitable type(s) of micro base stations. As depicted in FIG. 3, each handover distance margin distribution 300 is a Cumulative Distribution Function (CDF) showing distance margin for ideal handover without shadow fading for field deployment in a geographic location with uniform driving over all pixels of the reference signal strength map of FIG. 2. In general, the ideal base station is the serving base station with the largest reference signal strength and ideal handover keeps the wireless terminal connected to the strongest serving base station while also maximizing SINR distribution. In general, ideal handover would have mobility robustness and handover command at the point at which the reference signal strength of the serving base station equals the reference signal strength of the target base station. In general, ideal handover is not possible with existing handover algorithms, but serves to provide upper bounds on the achievable distance margins and SINR distribution. In general, distance margin is the distance between the ideal handover point and the point that handover would fail due to a Physical Downlink Control Channel (PDCCH) failure. It is noted that the failure point typically would be when PDCCH SINR was less than an SINR required for PDCCH decoding. The SINR may be derived from the server RSRP divided by the sum of all neighbour RSRP and noise for a full load case. To include dependence on loading, a weight of 0 to 1 representing fraction load could be applied to each neighbor RSRP. It is noted that the exemplary handover distance margin distributions 300 of FIG. 3 do not account for shadowing or multipath.

Figure 4:
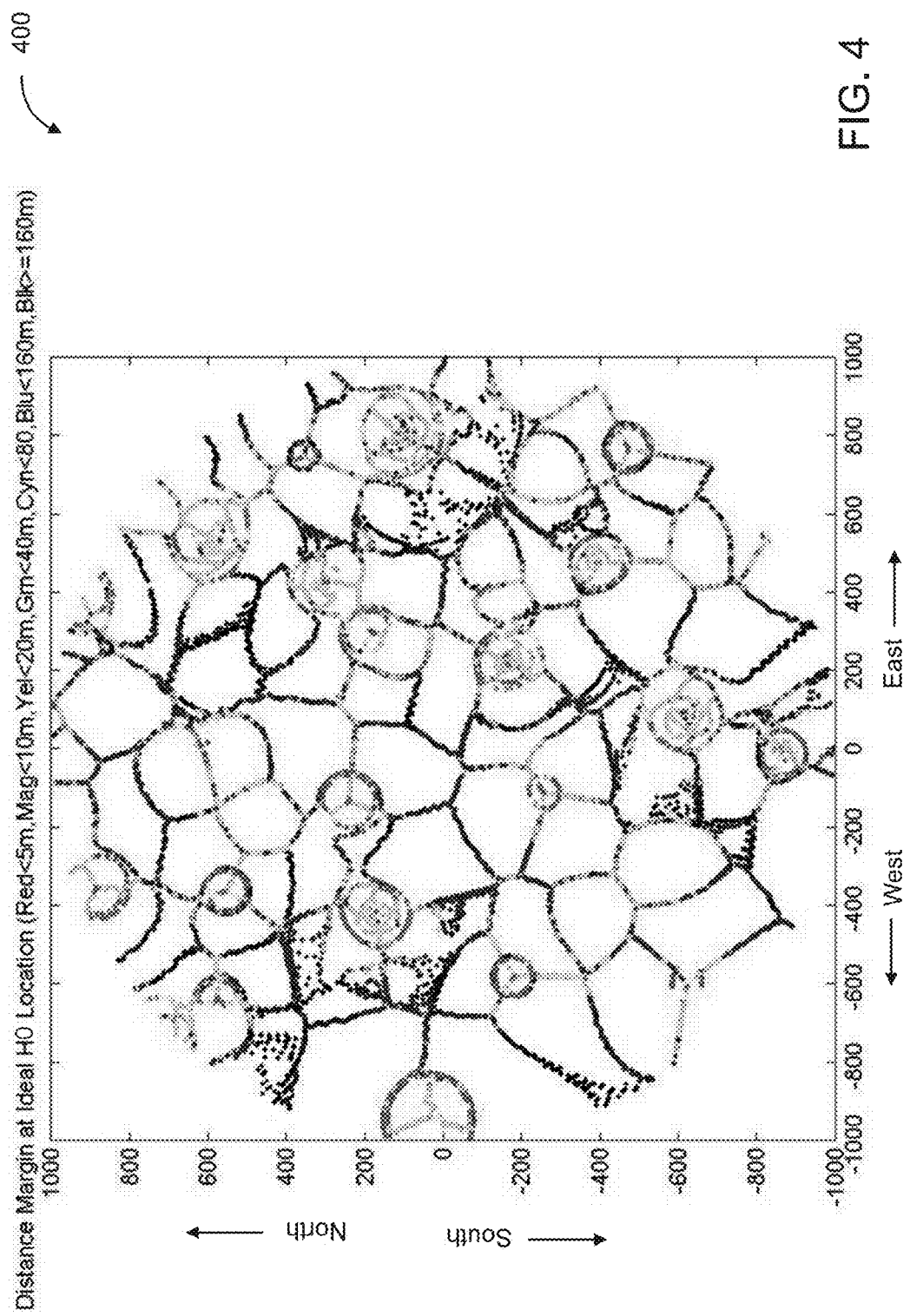
FIG. 4 depicts an exemplary handover distance margin map for the reference signal strength map of FIG. 2.

FIG. 4 depicts an exemplary handover distance margin map for the reference signal strength map of FIG. 2. The exemplary handover distance margin map 400 depicts distance margin by ideal handover location. The small distance margins depicted in the exemplary handover distance margin distributions 300 of FIG. 3 may be explained by observing in FIG. 4 that the small margins are related to transitions between main and side-lobe of vertical pattern where neighboring macro base stations (e.g., eNodeBs) become the best serving base station only for a short distance. It is noted that, since such changes in the best serving base station are ABA ping-pongs (e.g., ping pongs from base station A to base station B back to base station A), elimination of the signaling event (e.g., A3 event) for such ping-pongs would likely, but not necessarily, be the only successful course of action for the vehicular case. It is noted that, if street routes avoid the vertical side-lobe coverage zones, the small distance margins would not be included in a street route distance margin calculation; however, at least some of the side-lobe coverage zones are on the order of 200 m in diameter and, thus, may intersect with street routes at least in urban areas. It is noted that the pico coverage areas are on the same order as a majority of the lower Inter-Site Distance (ISD) macro coverage areas such that, even without shadowing, there is not expected to be a big difference in Time-of-Stay between macro cells and pico cells.

The handover time constraint represents a length of time within which the handover must be completed to prevent a handover failure. The determination of a handover time constraint based on the distance margin information may be performed based on speed information. The speed information may include one or more expected (or predicted) speeds or one or more actual (or measured) speeds. The speed information may include individual speeds, average speeds, maximum speeds (e.g., obtained from external navigation utilities or mapping utilities), or the like, as well as various combinations thereof. The speed information may include speeds for a specific wireless terminal (e.g., where the at least one configuration action adapted to satisfy a HOFR is specific to the wireless terminal), speeds for multiple wireless terminals associated with a particular base station (e.g., where the at least one configuration action adapted to satisfy a HOFR is determined for the base station), speeds for multiple wireless user terminals associated with one or both of the base stations of a base station pair (e.g., where the at least one configuration action adapted to satisfy a HOFR is determined for the base station pair), speeds for multiple wireless user terminals associated with one or more of the base stations of a set of base stations (e.g., where the at least one configuration action adapted to satisfy a HOFR is determined for the set of base stations), or the like, as well as various combinations thereof. The speed information may be represented as or indicative of a speed distribution (e.g., average speed distribution, maximum speed distribution, or the like), a speed map (e.g., based on average speed information, based on maximum speed information, or the like), or the like, as well as various combinations thereof.

The determination of at least one configuration action adapted to satisfy a HOFR based on at least one reference signal strength map may include determining Signal to Interference and Noise (SINR) information based on the at least one reference signal strength map and determining the at least one configuration action based on the SINR information.

The SINR information may include an SINR margin distribution, an SINR margin map (e.g., mapped based on geographic location), or the like, as well as various combinations thereof. An exemplary SINR margin map is depicted and described with respect to FIG. 5.

Figure 5:
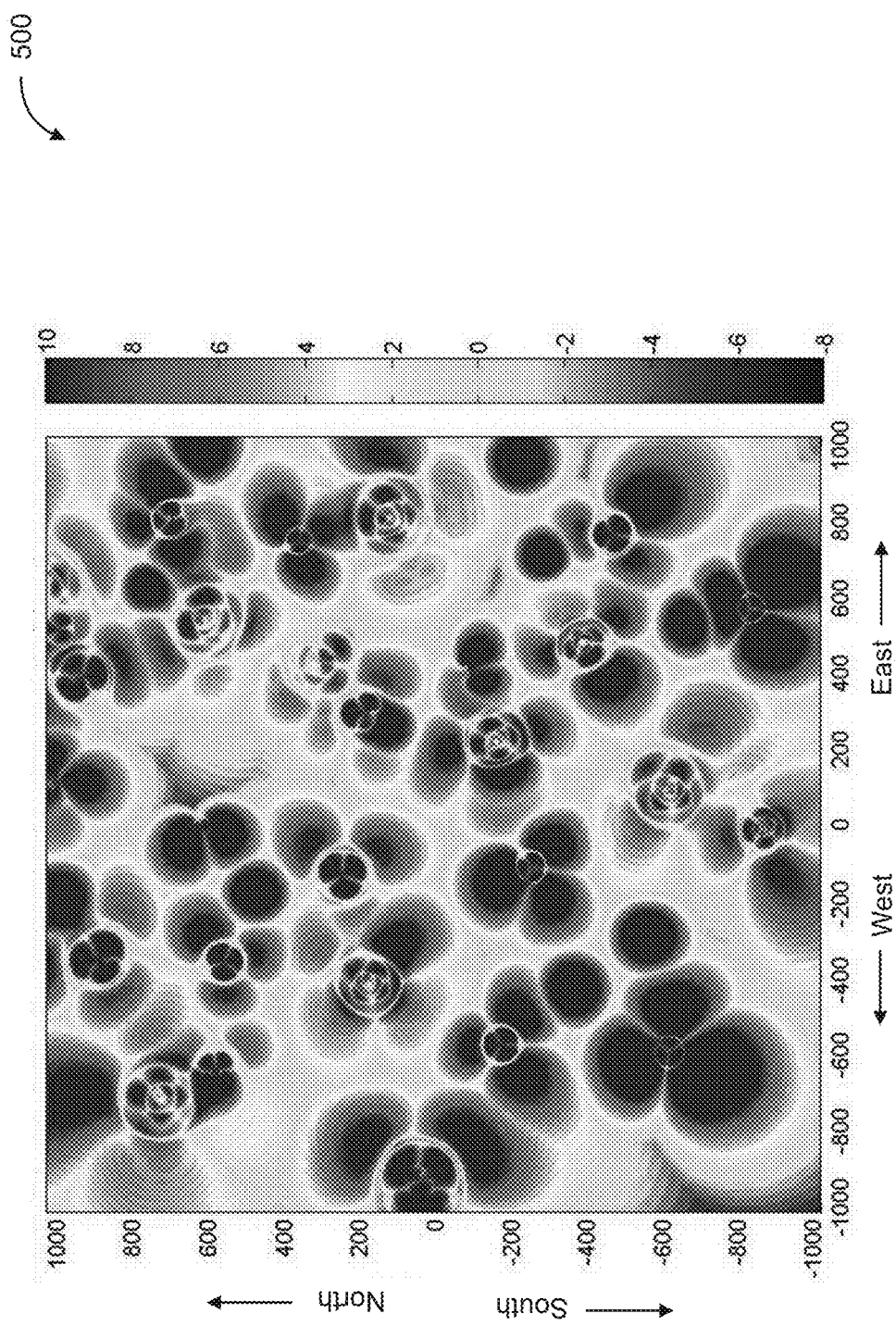
FIG. 5 depicts an exemplary Signal to Interference and Noise (SINR) map for the reference signal strength map of FIG. 2.

FIG. 5 depicts an exemplary SINR map for the reference signal strength map of FIG. 2.

As depicted in FIG. 5, exemplary SINR map 500 indicates SINR at geographic locations of the reference signal strength map of FIG. 2 (which depicts a geographic region including macro base stations and micro base stations). As with the reference signal strength map of FIG. 2, the exemplary SINR map 500 assumes a 6 dB 2×2 combining gain and uses Cost Hata at a 2 m resolution. It is noted that the geographic locations of the ten micro base stations, in most cases, may be identified by absence of vertical pattern side-lobes near the geographic location of the base station. It is noted that there is a two-cell base station (illustratively, in the vicinity of (East-West 0, North-South 600)) that is adjacent to a coverage hole (illustratively, in the vicinity of (East-West 50, North-South 650)) and, further, that the coverage hole can be eliminated via addition of a third cell to the two-cell base station.

The determination of SINR margin information may include determining at least one cumulative distribution of SINR based on the at least one reference signal strength map and determining the SINR margin information based on the at least one cumulative distribution of SINR.

The determination of at least one configuration action adapted to satisfy a HOFR may be performed based on the handover time constraint and the SINR information.

The at least one configuration action may include one or more of setting or adjusting one or more handover (HO) parameters, setting or adjusting one or more antenna parameters, or the like, as well as various combinations thereof.

In at least some embodiments, the at least one configuration action may include setting or adjusting one or more HO parameters. The one or more HO parameters may be set or adjusted in order to obtain a targeted HOFR. In at least some embodiments, this capability is provided by determining, from at least one reference signal strength map, distance margin distributions and SINR margin distributions allowing for successful handover. This could be applied to any technology doing hard handover in shared carrier (e.g., reuse 1) operation based on maps of received pilots or reference signals.

In at least some embodiments, setting or adjusting of HO parameters may include choosing Cell Specific Neighbor Offset (Ocn), Time to Trigger (TTT), Hysteresis (Hys), Offset (denoted as Off, which may be an A3 Offset (A3Off) or any other suitable type of Offset), and the layer 3 filter parameter K (hereinafter, K), from the A3 event equation specified by the Third Generation Partnership Project (3GPP), per individual ideal handover location to ensure that a particular actual handover event worked by satisfying the following constraint equation which is in time allowed after Hys, A3 Offset, Ocn, and SINR margin are approximately taken into account: DistanceMargin(e)/RoadSpeedLimit(e)>(TTT(s)+Tf(s)+Tp)*SinrMargin(e)/(SinrMargin(e)−HYS(s)−

A3Off(s)+Ocn(s,t)). Here, Tf(s) is a function of the layer 3 filter parameter K in the A3 event, the "e" in parenthesis signifies an observation associated with a particular handover event, the "s" in parenthesis signifies the server cell where the handover originates, the "t" in parenthesis signifies the target cell of the handover, and it is assumed that SinrMargin(e)−HYS(s)−A3Off(s)+Ocn(s,t)>0. It is noted that the road speed limit is an approximate estimate of the maximum speed that could be expected for the handover event and could be derived from an external database of mapping or navigation type web utilities. If there is more than one event per server cell, then the A3 event parameters may be chosen for the most restrictive event originating in that cell. It is noted that this embodiment may be used in the absence of specific UE speed information.

In at least some embodiments, one or more reference signal strength maps may be used to guarantee a target HOFR for hard handover in a wireless network or a portion of a wireless network. The one or more reference signal strength maps may be used to determine associated distribution information (e.g., the distribution of handover distance margin and the distribution of SINR margin) and the distribution information may be used to guarantee a target HOFR for hard handover in the wireless network or portion of the wireless network. The distribution information may be used to provide a constraint on a weighted sum of some or all of the HO parameters. The distribution information also may be used to provide a framework for adjusting one or more of those handover parameters to further optimize one or more other system performance metrics.

The handover distance margin may be defined as a distance between an ideal best server change location and a Radio Link Monitoring (RLM) defined failure location (or in LTE, an PDCCH channel failure point may be used). The failure location also may be dependent on system loading, so in at least some cases a loading value may be assumed (where values between 100% and 50% may be appropriate, but it will be appreciated that other values also may be used when appropriate). The handover distance margin may be converted to a handover time margin given speed information (e.g., speed information specific to a given wireless terminal, average speed information for a location(s) or a set of wireless terminals, maximum speed information for a location(s) or a set of wireless terminals, or the like). In at least some embodiments, one or more constraints on a linear combination of HO parameters that bound the HOFR due to downlink (DL) failures may then be applied. The HO parameters may include primary parameters (e.g., K, TTT, Hys, and Off) and secondary parameters (e.g., Cell Specific Offset of the Primary Cell (PCell) (Ocp), Ocn, or the like), where such parameters may include the corresponding parameters of 3GPP 36.331, Paragraph 5.5.4.4. In at least some embodiments, to adjust handover (HO) parameters for a particular wireless terminal, speed information associated with the wireless terminal may be determined and used to determine a handover time margin for the wireless terminal. In at least some embodiments, to adjust HO parameters for a particular cell, speed information associated with the cell is determined (e.g., speed distribution information determined based on speeds of UEs associated with the cell, maximum speed information associated with locations of the cell, or the like) and used to determine handover time margin information for the cell. It will be appreciated that the handover distance distribution is an ideal handover distance margin distribution, because it considers the ideal server change point to be the point where the instantaneous shadow faded best server changes. The failure location may be determined by a typical RLM $Q_{out}$ threshold (e.g., Radio Link Monitoring in 3GPP 36.113). A Radio Link Failure (RLF) is considered a handover failure if another choice of handover parameters can eliminate that failure. This definition, however, excludes the case of optimizing parameters to eliminate exposure to bug conditions. As noted above, given associated speed information (e.g., per wireless terminal, average, maximum, or the like), the handover distance margin can be converted to a time margin for handover. This time margin relation to hand over failures is most applicable to vehicular mobility (although it also may be applicable to other types of mobility). In general, for the pedestrian case, the time margin typically is so large that other metrics (e.g., handover rate, edge SINR, or the like) become more important. There also are RLFs caused typically by uplink (UL) issues such as large Interference over Thermal (IOT) or de-correlated (with DL) fast flat fading, that are more evident for indoor pedestrian mobility, that typically are not captured by the DL distance margin distribution and, therefore, would not be considered as handover failures by the earlier definition. The observed service measurement RLF rate is expected to provide a relatively tight upper bound on the DL HOFR if the system is interference limited on both UL and DL and well-designed so that significant DL interference is typically limited such that no more than two or three neighbors provide significant DL interference and the UL IOT is properly controlled.

The handover distance margin distribution may be computed or conditioned in various ways. The handover distance margin distribution may be computed over all handover instances per cluster or computation zone, conditioned on specific servers or server-target pairs in order to improve or optimize parameters on a per cell basis (but with some constraints for per cell optimization mentioned later), or the like. Similarly, the handover distance margin distribution may be conditioned on an individual cell, a cell pair, a specific type of handover, or the like. For example, a handover distance margin distribution conditioned on handovers from one cell could be used to set handover parameters for that cell in order to obtain a target HOFR as a function of speed over all handovers from that cell. For example, in a Heterogeneous Network (HTN) (e.g., a network including macro cells and pico cells), for handovers between a macro and pico pair without Enhanced Inter-Cell Interference Coordination (eICIC), the bias can be chosen such that the HOFR on macro-to-pico (MP) and the HOFR on pico-to-macro (PM) are equalized, without affecting hysteresis. This may be useful as, often, PM HOFR>>MP_HOFR.

Figure 6:
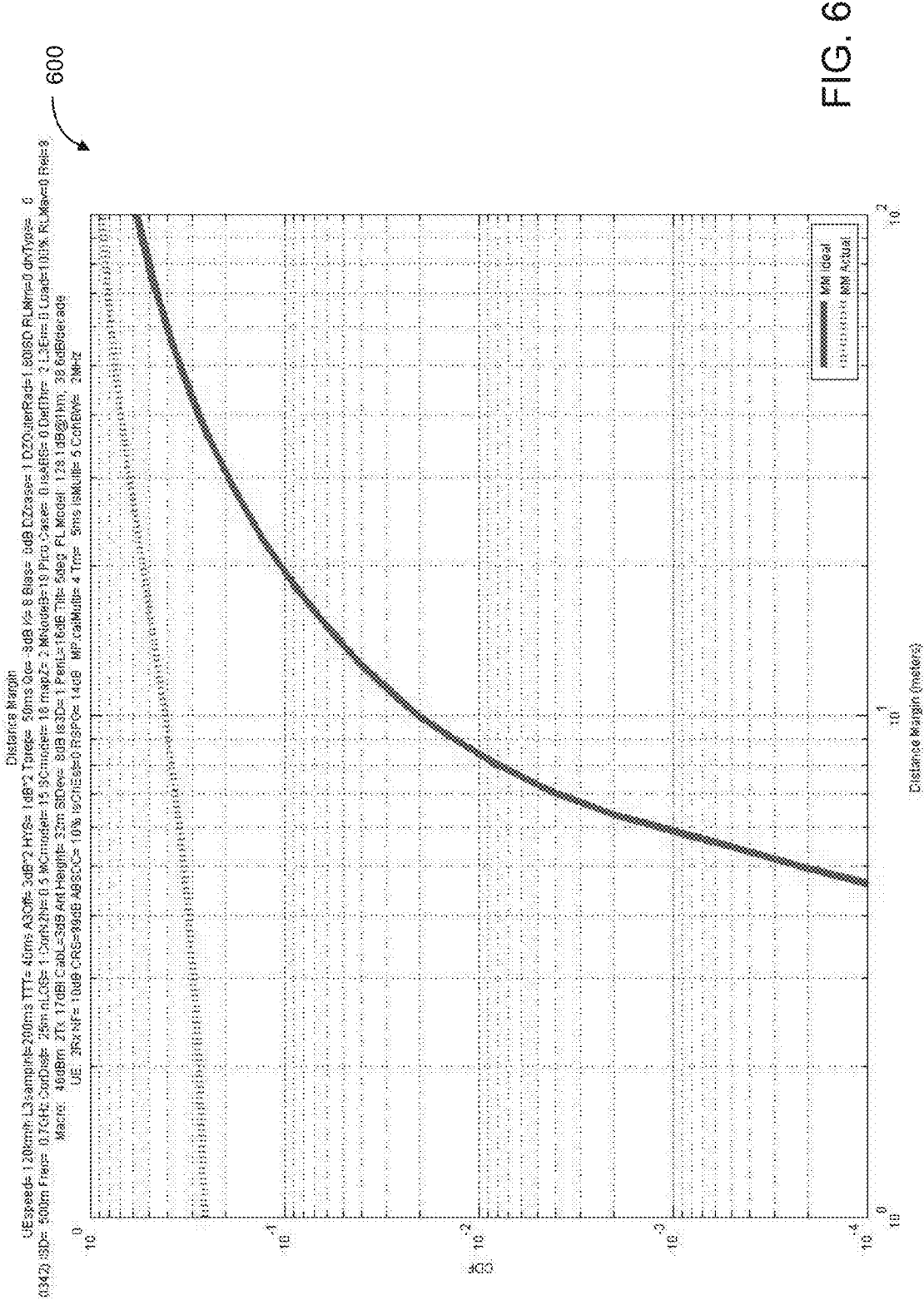
FIG. 6 depicts a typical simulated ideal distance margin distribution and an actual distance margin distribution.

The handover distance margin distribution may be better understood by considering typical ideal and actual distance margin distributions. FIG. 6 depicts a typical simulated ideal distance margin distribution and an actual distance margin distribution. The ideal distance margin distribution (which is represented by the solid line) does not have a Y-intercept, but, if it did, the Y-intercept would be the RLF rate not related to handover, since no handover parameter settings can achieve an RLF rate lower than this value. The actual distance margin distribution in FIG. 6 is the distance margin from the reconfiguration message point to the fail point. Here, the Y-intercept is the RLF rate, and this Y-intercept can be improved by changing handover parameters or performing tuning of deployed system (e.g., Radio Frequency (RF) tuning) to reduce interference and improve coverage.

It will be appreciated that the calculation of distance margin distribution, and estimated HOFR performance, can be performed from a predicted reference signal strength map (e.g., predicted by a RNP tool), a simulated reference signal strength map, or a service measurement reference signal strength map significantly faster than it takes to perform a handover simulation. Ultimately, though, service measurement derived reference signal strength maps, when available, are expected (in some, if not all, cases) to be most accurate and cost efficient. Also, distance margin distribution may be calculated using traffic weighted drive routes, or for uniform drive routes over roads. This calculation may include some or all effects of actual shadow fading, eNodeB cell deployments, tuning, or the like.

It will be appreciated that, at least within the context of this discussion, the handover failure rate as defined herein is not easily observable from current service measurements, as most of the RLFs (e.g., caused by poor choice of K, TTT, Hys) occur before a Measurement Report (MR) is received. For 3GPP MRO, for example, Late Handovers may be proportional to the HOFR defined here, but Late Handovers can result from high noise or interference such that no handover parameters will affect those failures, so the MRO Late Handover may be a sum of HOF and Noise and Interference Failure (NIF).

As noted herein, given the distance margin distribution F(Dm), then given speed S and distance margin Dm such that F(Dm)=HOFR, a handover time margin (Tm=Dm/S) can be determined which will ensure a maximum HOFR. If the effective time taken by the handover algorithm is less than the handover time margin, then the required HOFR will be satisfied, as described in the following constraint: Tm*(1−Hys'/SINRmargin)>(TTT+Tf(K,Ts)+Tp, where (1) Hys' is effective hysteresis defined as Hys'=Hys+Off+Ocp+Ofp−Ocn−Ofn in the A3 event equation of 3GPP 36.331 (where Ofn is the frequency specific offset of the frequency of the neighbor cell and Ofp is the frequency specific offset of the primary frequency), (2) Tf(K,Ts)=Ts*(Pf−Pv/log(1−2^(K/4))), and (3) Ts is the L3 filter sample rate, and Pf and Pv are tuning parameters satisfying 1>Pf>Pv>0.5.

In at least some embodiments, when per wireless terminal speed information is available, handover parameters can be chosen open loop per wireless terminal to just achieve the required Key Performance Indicator (KPI) on HOFR at each speed and, thus, a determination may be made as to the proportion of each HO parameter that may improve or optimize one or more metrics (e.g., ping-pong, handover, edge rate, or the like). It will be appreciated that increasing or decreasing any one of these HO parameters implies an offsetting decrease or increase, respectively, in one or more of the other HO parameters in order to maintain the same HOFR.

In at least some embodiments, when speed distribution information is available, HO parameters may be chosen to obtain a HOFR versus speed function as a target and an overall average HOFR.

In at least some embodiments, in order to determine maximums on each of HO parameters K, TTT, and Hys', minimum values are substituted for each pair of HO parameters and the maximum possible value for the remaining HO parameter is determined. For example, rearranging the above equation yields: Hys'<SINRmargin*(1−S/Dm*(TTT+Tf+Tp). If TTT and Tf are set to minimum values (e.g., almost 0) and Tp (which is small) is ignored, the maximum constraint on Hys' is Hys'<SINRmargin. In at least some simulation studies, SINR margin has been found to be around 8 dB for 2×2 antenna configuration at full load, over a large range of different shadowing correlation distances.

It will be appreciated that loading between 50% and 100% would make about 3 dB difference (untuned) and 1×1 to 2×2 would imply an approximate 6 dB difference in the PDCCH SINR margin. This may be described in MATLAB code as follows:

Margin=k*mean(SINR(servRSRP==neibRSRP)−SINR_fail_threshold). This margin may be a function of DL antenna configuration, loading, antenna patterns, cell layout, downtilting, and tuning parameter k.

It will be appreciated that SINR margin can be determined in a manner similar to distance margin (e.g., from a cumulative distribution of service measured PDCCH SINR map, which may be calculated from the service measured RSRP map). If Hys' is set equal to the median SINR margin, a 50% HOFR (which may be too large) is expected. The SINR margin might be smaller in field due to departure from optimum cloverleaf cell locations. Similarly, 0<Tf<Tm and 0<TTT<Tm.

As noted above, the handover distance margin distribution can be conditioned on an individual cell, a cell pair, a specific type of handover, or the like. As a result, the handover distance margin distribution may be used in a distributed fashion to improve (or optimize) handover parameters in one cell, for pairs of cells, for cell-type pairs, across clusters of cells, or the like, as well as various combinations thereof.

Figure 7:
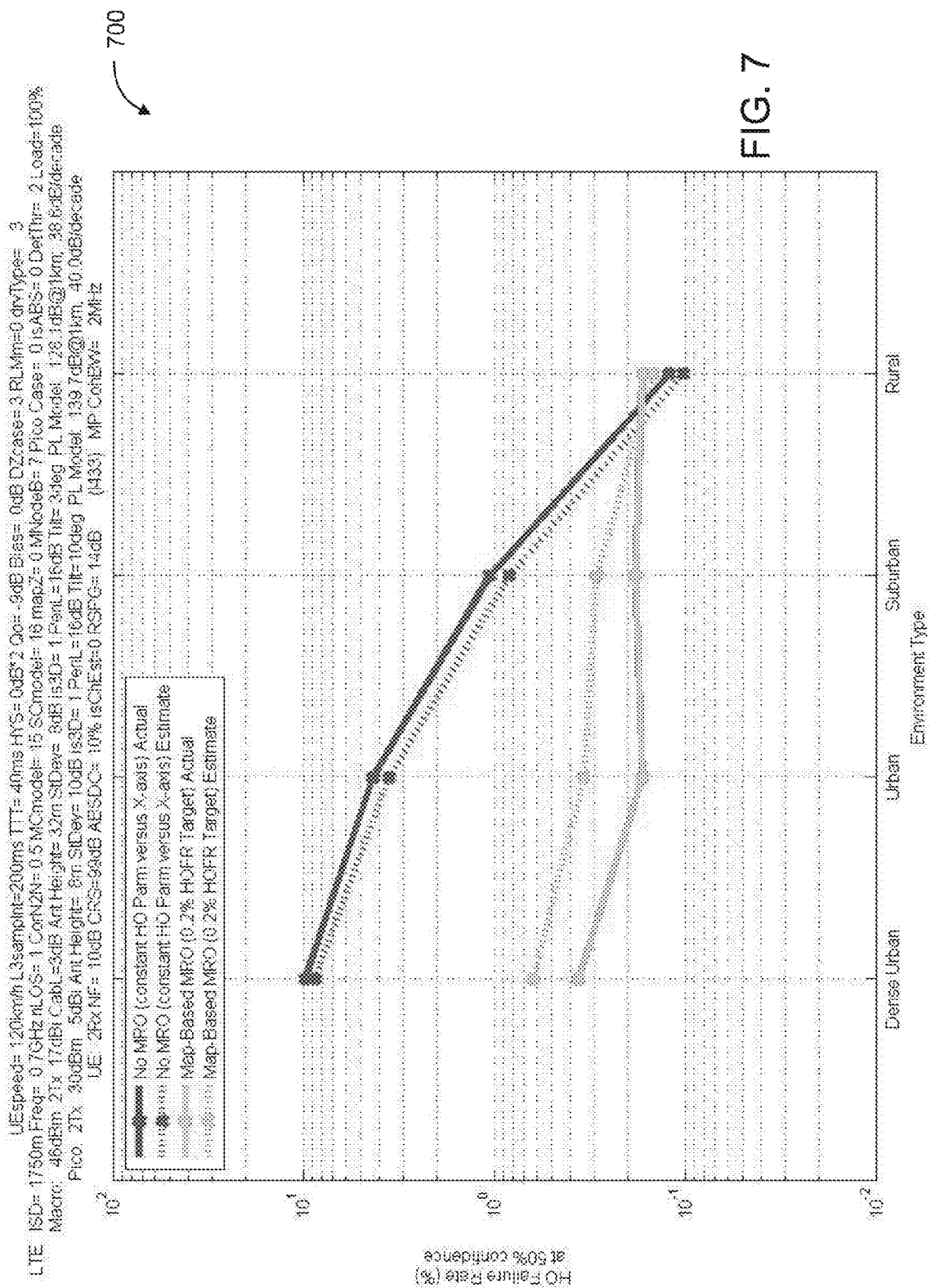
FIG. 7 depicts predicted and simulated handover failure rate (HOFR) versus environment type with map-based mobility robustness optimization (MRO) and without map-based MRO.

As noted above, the at least one configuration action may include setting or adjusting one or more HO parameters in order to obtain a targeted HOFR. FIG. 7 depicts predicted and simulated HOFR versus environment type with map-based MRO and without map-based MRO (where, in map-based MRO, an exemplary target HOFR value of 0.2% is used for HO parameter optimization). The predictive value of the above-described equations is demonstrated using simulation. In FIG. 7, the estimated HOFR and the actual HOFR is shown, with use of map-based MRO and without use of map-based MRO, versus different environment types. The non-MRO estimated HOFR uses the distance margin distribution for each environment type and assumed single set of HO parameters, while the non-MRO actual HOFR is simulated for those same HO parameters. The map-based MRO case, for each environment, uses the handover distance margin distribution for the environment to set the HO parameters in the environment such that the exemplary target HOFR value of 0.2% is achieved.

Figure 8:
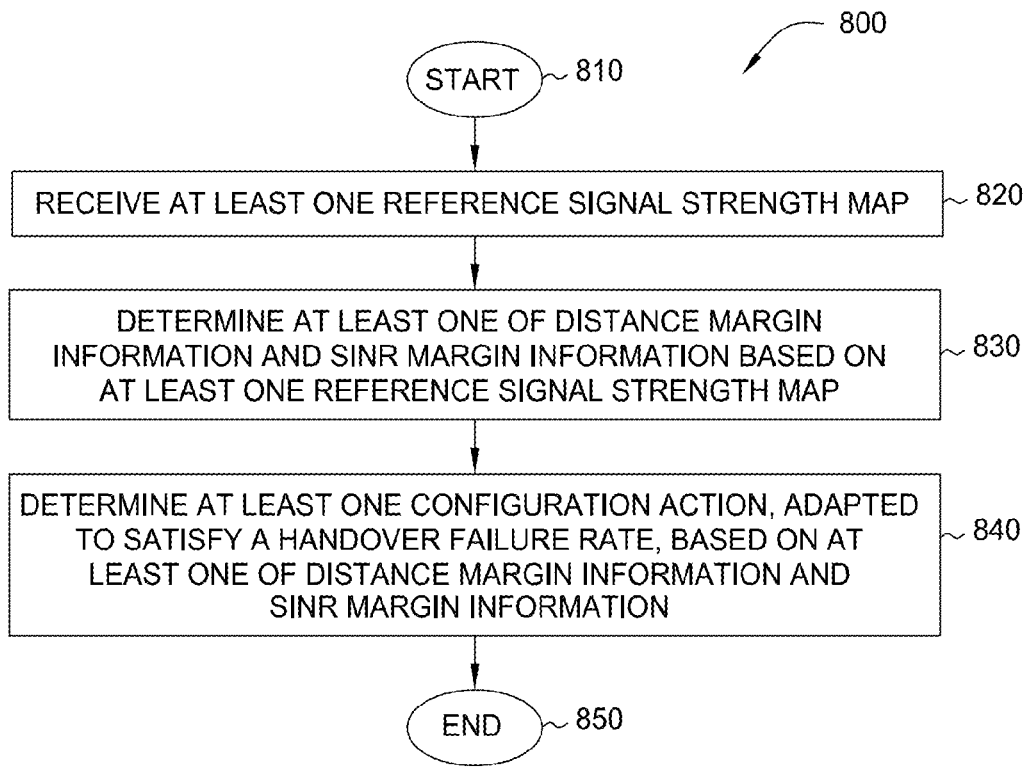
FIG. 8 depicts one embodiment of a method for determining at least one configuration action adapted to satisfy a handover failure rate.

FIG. 8 depicts one embodiment of a method for determining at least one configuration action adapted to satisfy a handover failure rate. At step 810, method 800 begins. At step 820, at least one reference signal strength map is received. At step 830, at least one of distance margin information and SINR margin information is determined based on the at least one reference signal strength map. At step 840, at least one configuration action adapted to satisfy a handover failure rate is determined based on at least one of distance margin information and SINR margin information. At step 850, method 800 ends.

In at least some embodiments, reference signal strength information associated with wireless network 110 may be used to prevent handover race conditions in wireless network 110. In at least some embodiments, at least one reference signal strength map may be used to prevent handover race conditions. The at least one reference signal strength map may be used to prevent handover race conditions for wireless network 110 or a portion of wireless network 110 (e.g., an individual base station 112, a pair of base stations 112, a set or cluster of base stations 112, or the like, as well as various combinations thereof). In general, handover race is fundamentally different, and more disruptive, to system performance than ping-pong (which does not include all cases of short time-of-stay problems that can occur).

In at least some embodiments, a capability is provided for guaranteeing that there are no handover race conditions in a cluster of cells covered by a reference signal strength map.

In at least some embodiments, a capability is provided for guaranteeing that there are no handover race conditions resulting from unconstrained use of the CIO (Cell Individual Offset) parameter Ocn in the 3GPP 36.331 A3 Event Condition. It will be appreciated that at least some such embodiments may have general applicability at all times, and may be particularly useful when CIO values are large (e.g., when eICIC is used).

In at least some embodiments, fully distributed per-cell constraints may be used to ensure that there are no handover race conditions in a wireless network.

In at least some embodiments, at minimum there may be constraints on independent per cell adjustment of Ocn and Ocp (and, optionally, one or more other A3 event parameters). When the per cell parameters are adjusted independently of neighbor cells, a distributed and more than sufficient (not necessary, in general) condition which avoids race condition is Hys'=Hys+Off−Ocn+Ocp−Ofn+Ofp>0 (i.e., effective per cell hysteresis Hys' is positive), where the listed parameters are from the A3 event equation in 3GPP 36.331 (i.e., Mn+Ofn+Ocn−Hys>Mp+Ofp+Ocp+Off, where it is assumed that Off+Hys>0, with the intent that the wireless terminal should have to pass the point of Mp=Mn before an A3 event is triggered when there is no coordination between cells). Here, as defined in the 3GPP, Mn is a measurement result of the neighboring cell (not taking into account any offsets) and Mp is a measurement result of the PCell (again, not taking into account any offsets). With a fully distributed implementation as given above, this is the case. If the effective per cell hysteresis Hys' is negative, there is a handover race condition when |M(A)−M(B)|≤Hys', where and M(A) and M(B) are Cell A and Cell B reference signal strength maps, respectively.

In at least some embodiments, the handover race condition is defined to be a condition when the wireless terminal is stationary with constant average reference signal strength maps from all cells and where the wireless terminal observes an A3 event condition immediately after handover is complete and would send measurement reports and expect to do further handovers as soon as possible after the last handover is complete and to continue to do so over time. If the wireless terminal is moving then the race condition would last only as long as the wireless terminal was in a handover race location zone. It is noted, as discussed above, that a handover race condition is fundamentally different from ping-pong, as ping-pong typically includes only ABA handovers where the time-of-stay on Cell B is less than some time threshold (e.g., typically between 0.5 seconds and 2 seconds). It is further noted that ABA ping-pongs result from short distance reversals in the best server, while handover race conditions can occur with no changes in reference signal strength maps of Mn or Mp and can follow sequences of serving cell patterns such as ABABA ..., ABCABC ..., ABCDABCD ..., or the like where the time-of-stay on each visit to cell A, cell B, cell C, and cell D is the minimum possible time-of-stay. It is further noted that such handover race patterns have been observed in simulations of eICIC where biases are relatively large.

In at least some embodiments, cell pair constraints may be used to ensure that there are no handover race conditions. In one embodiment, cell pair constraints orthogonal to effective hysteresis may be used to ensure that there are no handover race conditions. In one embodiment, cell pair constraints orthogonal to effective hysteresis and having global bias within the eICIC context may be used to ensure that there are no handover race conditions. These embodiments are discussed in conjunction with each other.

It is noted that, when it is necessary or desirable to use a relatively large positive Ocn in order to enhance coverage of a neighbor (e.g., such as in the HTN context), then the per cell hysteresis race-free condition (Hys'>0) may not allow for much range extension.

In at least some embodiments, the above-mentioned problem regarding use of relatively large positive Ocn may be at least partially solved by defining a 2-cell effective hysteresis (e.g., between 2 cells A and B) as Hys"(A,B)=Hys"(B,A)=(Hys'(A)+Hys'(B))/2, and observing that (1) Hys"(A,B)>0 implies race-free AB handovers and (2) any combination of Ocn(A) and Ocn(B) such that Ocn(A)+Ocn(B)=0 is possible without changing the effective 2-cell hysteresis between Cell A and Cell B. It is noted that, while more negative Ocn values may be possible, this increases effective hysteresis which is itself subject to constraints for HOFR.

In at least some embodiments, if Hys"(A,B)>0, then the per cell constraints Hys'(A) and Hys'(B) are not required for handovers involving only Cell A and Cell B. Some patterns of 2-cell race-free, such as +X bias from all macros to all micros and −X bias from all micros to all macros may work (it is noted that this may be used as described by Ocn(A,B)=−Ocn (B,A) over all cell pairs) without changing effective hysteresis, however, Hys"(A,B)>0 between all pairs of cells may not be a sufficient condition for race-free handovers when clusters of more than two cells are considered.

In at least some embodiments, one or more reference signal strength maps are used to ensure that there are no handover race conditions.

In at least some embodiments, the one or more reference signal strength maps are used to detect and eliminate handover race conditions at any wireless terminal location within a cluster of cells based on one or more reference signal strength maps associated with the cluster of cells.

In at least some embodiments, given a reference signal strength map, handover race conditions are prevented or eliminated (thereby resulting in a race-free system) if and only if there are one or more stable servers at every location of the reference signal strength map. This condition may be represented in a number of ways.

For example, this condition may be represented as:
if and only if given at least one server i at any UE location
$\max_j(RSRP_j+b_{ij})=i$
the system is race-free
where $b_{ij}=-Ocn(i,j)$ $b_{ii}=0$ $b_{ij}=b_{ji}$
$\max_j$ is the maximum of the argument over the index j, and Ocn(i,j) is the 3GPP Ocn from Cell i to Cell j.

For example, this condition may be represented using the following Matlab code:

```
% xPixels=512;yPixels=512;
% RSRP a (NumCells,xPixels*yPixels) array in dBm
% Bias is skew symmetric zero diagonal bias matrix)
% Bias(cidi,cidj) is bias from cell cidi to cell cidj
biasedServer=zeros(1,xPixels*yPixels);
biasedRSRP=zeros(1,xPixels*yPixels)−150;
for cidi=1:NumCells,
    for cidj=1:NumCells,
        RSRPa(cidj,:)=RSRP(cidj,:)+Bias(cidi,cidj);
    end
    [rsrp,stableCID]=max(RSRPa);
    biasedRSRP(cidi==stableCID)=rsrp(cidi==stableCID);
    biasedServer(cidi==stableCID)=stableCID;
end
% biasedServer==0 indicates a race condition
```

It is noted that one demanding use case for CIO is the use of bias to enhance coverage areas of relatively small cells. There are two opposing approaches from a race-free handover consideration:

(1) Equal bias to every micro from every macro in neighbor macro set where Ocn(A,B)=−Ocn(B,A) and Ocn(A,B) >0, where A represents all macro set cells and B represents micro cells. This case is race-free stable, but if there are no traffic hotspots present in some macros, there will be a net capacity loss in neighbor macros without a deployed micro. If Ocn(A,B) is largely different between differing macro-micro pairs there may still be race conditions, so to use this strategy it may be necessary to use the same bias over all macro-micro pairs in a cluster where the micro shows in the neighbor set of macros.

(2) Only enough bias from each macro in macro set toward deployed micro cell so that coverage enhancement goal and race-free condition is achieved. This macro set is smaller than the macro set in approach (1), since larger bias in further neighbors may bring even additional further macros into play for race-free condition.

It is noted that the handover neighbor list of the micro may not be the list of neighbors required for bias and blanking, as an increase in bias to the nearest macros brings more neighbor macros into play for race-free condition and coverage enhancement. For example, if bias to home macro is zero, the blanking set of neighbor macros can be null. As the bias increases, the blanking set size grows and, for larger biases, the blanking set can be larger than the handover neighbor set.

In at least some embodiments, a process that may be used to determine bias for approach (2) provided above includes: (1) choosing a coverage target for a micro that is adapted to provide a necessary or desired association rate or traffic offload for its neighbor macros (e.g., which may be determined in detail by other analysis or processed jointly with Almost-Blank Subframe (ABS) duty cycle) and (2) iteratively determine a minimum bias which may be higher than the bias determined from step (1) with respect to each neighbor in a manner for ensuring that the race-free handover and coverage goal is satisfied.

Figure 9:
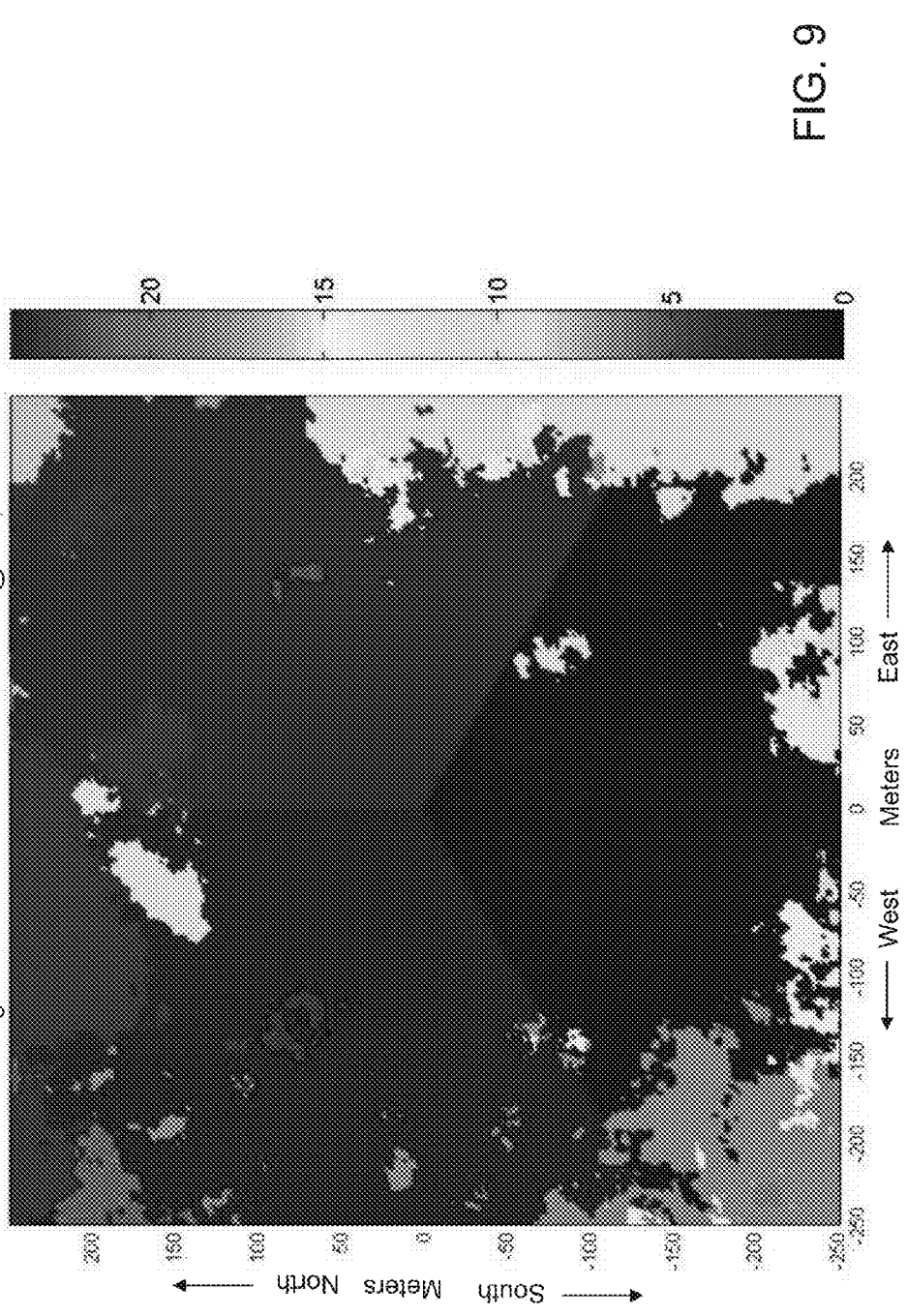
FIG. 9 depicts a best server map for a system having a base station deployment including seven macro nodes and three micro nodes.
Figure 10:
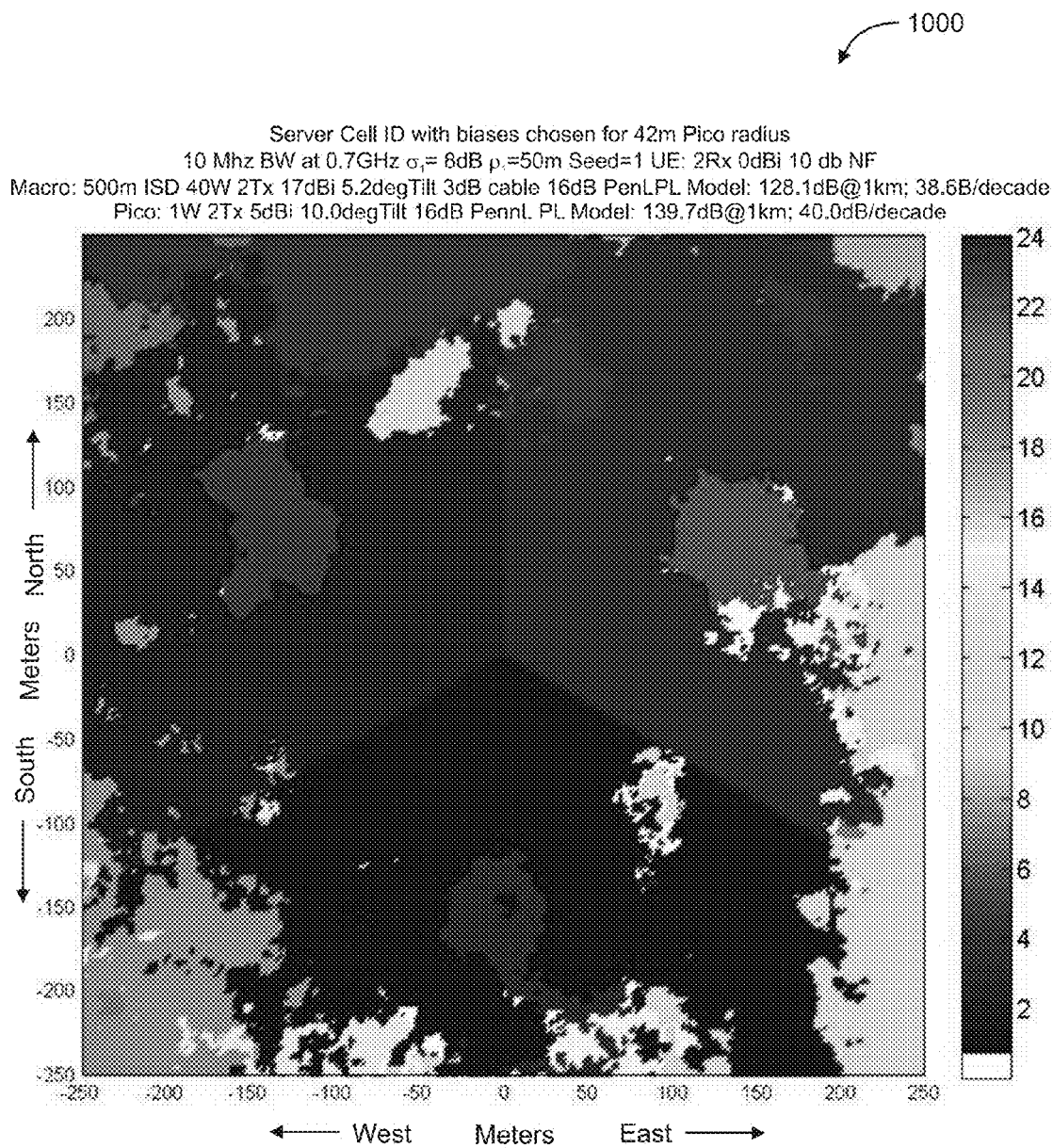
FIG. 10 depicts a map illustrating coverages of the micro nodes when biases were added toward the micro nodes depicted in FIG. 5.
Figure 11:
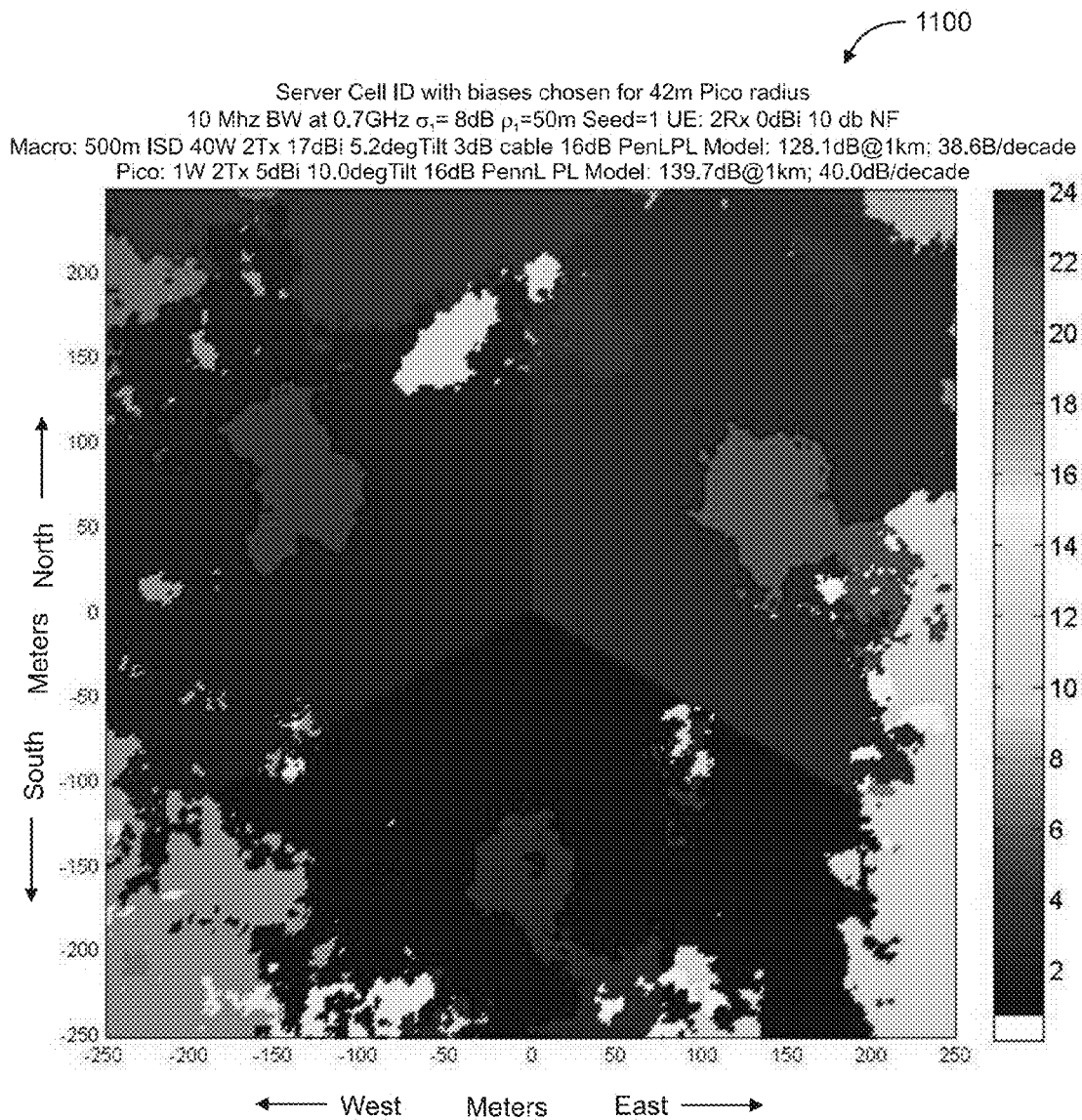
FIG. 11 depicts a map illustrating coverages of the micro nodes when additional biases were added toward the micro nodes depicted in FIG. 6.

FIG. 9, FIG. 10, and FIG. 11 depict the micro coverage and race zones for no bias with different amounts of bias per macro toward micro cells.

In FIGS. 9, 10, and 11, twenty-one macro cells (denoted as macro cells 1-21) and three micro cells (denoted as pico cells 22-24) are supported in the depicted geographic area.

Macro cells 1, 2, and 3 correspond to a macro node (e.g., eNodeB) that is located at the center of the depicted geographic area (omitted from FIGS. 9, 10, and 11 for purposes of clarity), where macro cell 1 faces South from the center of the depicted geographic area, macro cell 2 faces Northwest from the center of the depicted geographic area, and macro cell 3 faces Northeast from the center of the depicted geographic area.

Pico cells 22, 23, and 24 correspond to three pico nodes, including (1) a first pico node, associated with pico cell 22, which is approximately located at [East-West 150, North-South 75] which is in macro cell 3, a second pico node, associated with pico cell 23, which is approximately located at [East-West −140, North-South 75] which is in macro cell 2, and (3) a third pico node, associated with pico cell 24, which is approximately located at [East-West −20, North-South −160] which is in macro cell 1.

FIG. 9 depicts a best server map for a system having a base station deployment including seven macro nodes and three micro nodes. In FIG. 9, the system is a 500 m ISD system and the micro nodes are added at 0.3 ISD. In FIG. 9, regions of pico cell coverages with no bias include (1) pico cell coverage for pico cell 22, which includes the region defined from [130 to 150] in the East-West direction and from [60 to 80] in the North-South direction and (2) pico cell coverage for pico cell 23, which includes the outer portions of the region defined from [−110 to −140] in the East-West direction and from [50 to 90] in the North-South direction. In FIG. 9, pico cell 24 has no coverage due to macro shadowing upfade. In FIG. 9, the average effective radius of picos 22, 23, and 24 is approximately 7 m.

FIG. 10 depicts a map illustrating coverages of the micro nodes when biases were added toward the micro nodes depicted in FIG. 9.

As depicted in FIG. 10, biases were added to improve average effective radius of picos 22, 23, and 24 from approximately 7 m to approximately 50 m. Namely, the coverage area of pico cell 22 expanded to cover a region defined from [100 to 200] in the East-West direction and from [25 to 120] in the North-South direction, the coverage area of pico cell 23 expanded to cover a region defined from [−80 to −170] in the East-West direction and from [20 to 130] in the North-South direction, and the coverage area of pico cell 24 expanded to cover a region defined from [30 to −50] in the East-West direction and from [−200 to −100] in the North-South direction.

Figure 12:
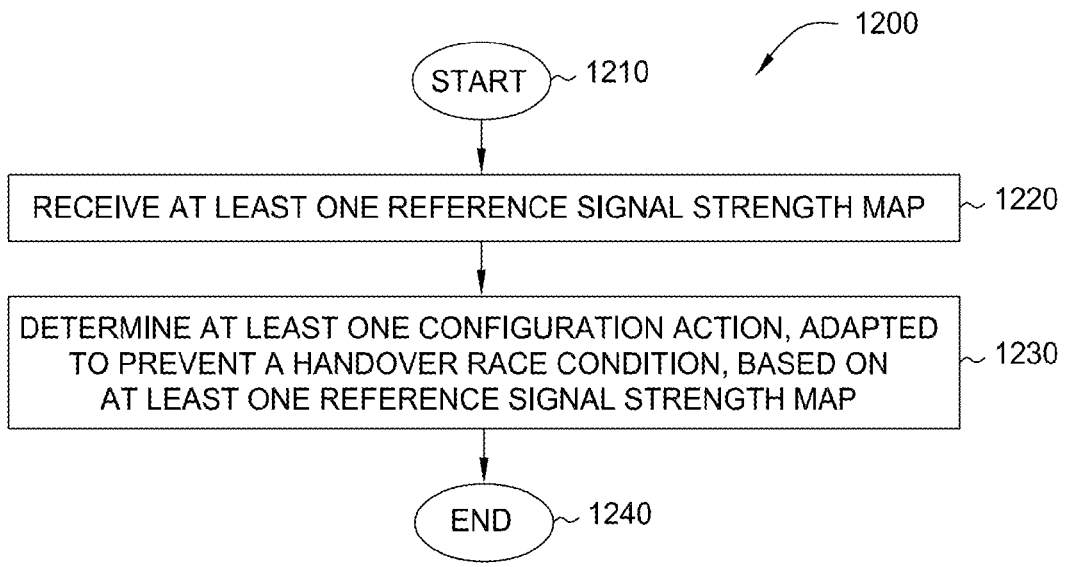
FIG. 12 depicts one embodiment of a method for preventing handover race conditions.

As further depicted in FIG. 10, the chosen biases also cause handover races in certain geographic regions on the map (illustratively, certain white, or lighter, areas on the map). For example, handover race conditions exist at the lighter portions of the coverage area of pico cell 22 (illustratively, a large part of the Southern-most portion of the coverage area of pico cell 22, a small region located near [East-West 180, North-South 100], and other small regions generally located at or near the Southeastern portion of the pico cell 22). For example, handover race conditions exist at the lighter portions of the coverage area of pico cell 23 (illustratively, from [−120 to −130] in the East-West direction and from [130 to 135] in the North-South direction, as well as at a [−160] in the East-West direction and [40] in the North-South direction). For example, handover race conditions exist at the lighter portions of the coverage area of pico cell 24 (illustratively, at a small region located near [East-West 0, North-South −200], at a small region located near [East-West 5, North-South −205], at a small region located near [East-West 25, North-South −225], at a small region located near [East-West 75, North-South −200], and so forth. For example, handover race conditions exist in a region located within macro cell 1 near its border with macro cell 3 (illustratively, the outer, lightest portions of the region defined from [60 to 120] in the East-West direction and from [−120 to −50] in the North-South direction. FIG. 11 depicts a map illustrating coverages of the micro nodes when additional biases were added toward the micro nodes depicted in FIG. 10. The additional biases were added to remove handover race conditions. In viewing FIGS. 10 and 11 together, it may be seen that the regions of FIG. 10 corresponding to handover race conditions (as discussed above, certain clusters of white, or lighter, areas on the map of FIG. 10) are no longer present in FIG. 11. FIG. 12 depicts one embodiment of a method for preventing handover race conditions. At step 1210, method 1200 begins. At step 1220, at least one reference signal strength map is received. At step 1230, at least one configuration action adapted to prevent a handover race condition is determined based on the at least one reference signal strength map, At step 1240, method 1200 ends.

Figure 13:
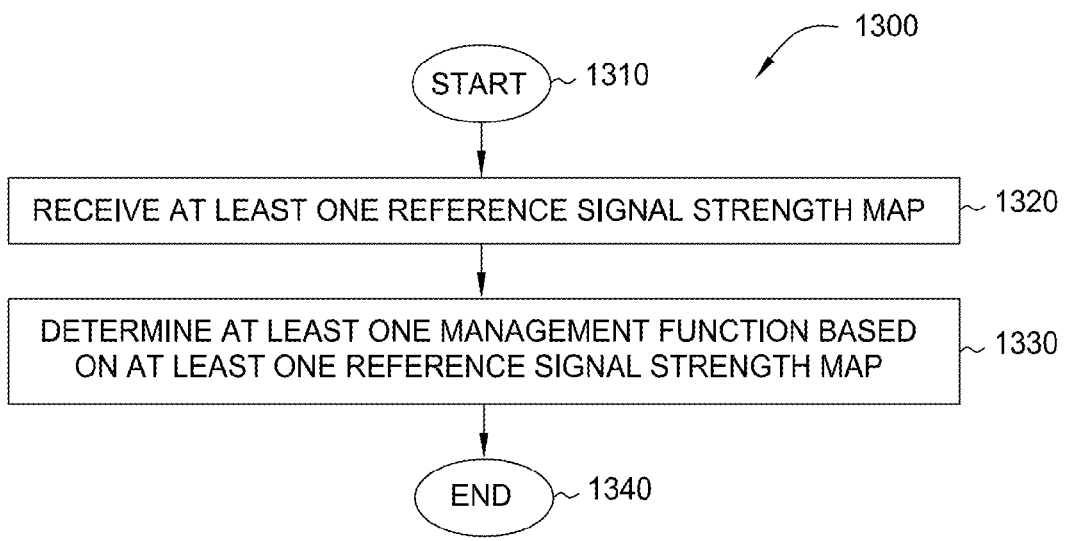
FIG. 13 depicts one embodiment of a method for providing one or more management functions for a wireless network based on one or more reference signal strength maps associated with the wireless network.

FIG. 13 depicts one embodiment of a method for providing one or more management functions for a wireless network based on one or more reference signal strength maps associated with the wireless network. At step 1310, method 1300 begins. At step 1320, at least one reference signal strength map is received. The at least one reference signal strength map is associated with the wireless network. At step 1330, at least one management function is determined based on the at least one reference signal strength map. At step 1340, method 1300 ends.

Various embodiments depicted and described herein may utilize information to set or adapt HO parameters in a wireless network. The information may include one or more of reference signal strength maps, interference maps (e.g., SINR maps), or the like. The information may be actual information (e.g., based on measurements from the wireless network) or estimated/predicted information (e.g., using estimation or prediction capabilities of RNP tools or other tools or systems). The use of such information to set or adapt NO parameters in a wireless network provides significant advantages over existing mechanisms for determining HO parameters, especially in HTN networks where small cell coverage eases the extraction of such information from network measurements even in the absence of geodetic wireless terminal coordinate reporting (e.g., wireless terminal geo-location) or the absence of MDT wireless terminal capabilities.

Various embodiments depicted and described herein utilize information to set or adapt HO parameters in a wireless network where the HO parameters are HO parameters as specified in the 3GPP MRO solution (or similar HO parameters defined for 3GPP or in other types of wireless networks). For example, 3GPP MRO classifies handover failures as Late, Early, or Early/Wrong Cell, and specifies an optimization algorithm that uses this information (along with additional information such as Ping Pong, Handover Rate, and the like) to optimize parameters including the Cell Specific Offset of the Serving Cell (Ocs), Ocp, TTT, K, A3Off, and Hys.

Various embodiments depicted and described herein are designed or configured based on recognition that the various parameters and analysis specified in the 3GPP MRO solution may be deficient. For example, the gradient estimated by the Early/Late proportion does not appear to be very effective or useful since, in typical simulation or field scenarios for handover where the parameters have already been hand crafted, the failures are all Late failures. For example, if Early failures are observed in the field it is expected that these are due to either bugs, de-correlated UL multipath, or improperly managed uplink IOT, which can cause handover failures that are not related to poor choice of K, TTT, Hys, A3Off, or Ocn. It is noted that either bugs or issues with UL power control might be best eliminated by simply lowering the handover rate which has its own performance penalties such as degraded DL and UL edge rates.

Various embodiments depicted and described herein are designed or configured based on recognition that the 3GPP MRO solution often fails to provide effective constraints on HO parameters. For example, if an operator has a requirement on the maximum HOFR, there is no indication as to how the requirement constrains the K, TTT, and Hys. Similarly, for example, there is no indication as to which of TTT, Hys or K is to be reduced when the failures are typically Late. Similarly, for example, there is no indication as to steps sizes to use for K, Hys or TTT. Similarly, for example, there is no indication as to what constraints are placed on CIO (Ocn in A3 Event) if CIO is used on a de-centralized model. It is noted that, if CIO is adjusted too far in the positive direction, a handover race condition may result, which is much more severe than typical ping-pong. The handover race condition occurs when the UE is stationary in a location zone (race zone) that has no solution for best server. In a 2-cell case, the race zone it is defined by $|M_A - M_B| \leq H_E$, where $M_A$ and $M_B$ are the reference signal strength maps of Cell A and Cell B, respectively, and $H_E$ is effective hysteresis. The stationary zone, in general, is characterized by a wireless terminal observing an A3 event condition immediately after every handover is complete and continuing to do so over time. If the wireless terminal is non-stationary, the race condition only lasts for the duration of its time in the race zone. It is noted that handover race can be avoided by proper constraints on CIO and effective hysteresis. While per cell (de-centralized) constraints are possible on CIO, use of such constraints may result in a sub-optimum benefit. In at least some embodiments, cluster based constraints on CIO are used when using larger positive bias.

Various embodiments depicted and described herein relate the combined setting of primary HO parameters (e.g., K, Hys, A3Off, or TTT) to an expected HOFR for a given wireless terminal speed based on service measurements and/or offer proper constraints on the setting of CIO and effective hysteresis to avoid handover race problem. This represents a significant improvement over the 3GPP MRO solution, at least in view of the fact that (1) at least some race conditions (e.g., ABCABC ... for example) are not captured as ping-pongs and (2) a small number of race locations may not appear as significant in the overall statistical compilation, but UEs at these locations would have low throughput as the UEs would be in a constant state of handover with few opportunities to send or receive traffic (which may in turn increase the handover overhead affecting loading of the MAC layer implementation, including, among others, MME, X2 and S signaling loading).

Various embodiments depicted and described herein may provide one or more of the following improvements over the 3GPP MRO solution: (1) handovers failure observations are not required in order to set HO parameters for a given HOFR, (2) while HOFR may be a strong function of loading, embodiments of map-based MRO can use reference signal strength map measurements from any loading conditions to predict HOFR for any load conditions, and (3) distance margins can be conditioned on cell or types of handovers (e.g., such as, for example, Pico-Macro (PM) or Macro-Pico (MP), in order to determine best bias setting to equalize MP and PM HOFR).

Various embodiments depicted and described herein provide a new handover optimization feature in a RNP tool for both LTE cell change (e.g., primarily) and HSDPA cell change (e.g., secondarily).

Various embodiments depicted and described herein provide a new Self-Optimizing Network (SON) MRO feature configured to enable certain types of reference signal strength information (e.g., reference signal strength maps available from network data (e.g., Element Management System reports)) to be used in the setting or adaptation of one or more HO parameters.

Various embodiments depicted and described herein provide mechanisms to more easily achieve KPI on dropped call rate without race conditions (where a race may be considered to be a ping-pong with effectively zero time of stay on each handover).

Various embodiments depicted and described herein provide recommendations for parameter tuning in a wireless network. Various embodiments depicted and described herein support initiation of parameter tuning in a wireless network. Various embodiments depicted and described herein provide recommendations for parameter tuning in a wireless network and support initiation of parameter tuning in the wireless network.

It will be appreciated that, although primarily depicted and described herein within the context of specific types of wireless networks (e.g., wireless networks supporting specific types of wireless technology, specific types of wireless network elements, specific types of wireless network functions, or the like), embodiments according to the principles described herein may be provided within various other types of wireless networks (e.g., wireless networks supporting other types of wireless technology, other types of wireless network elements, other types of wireless network functions, or the like).

Figure 14:
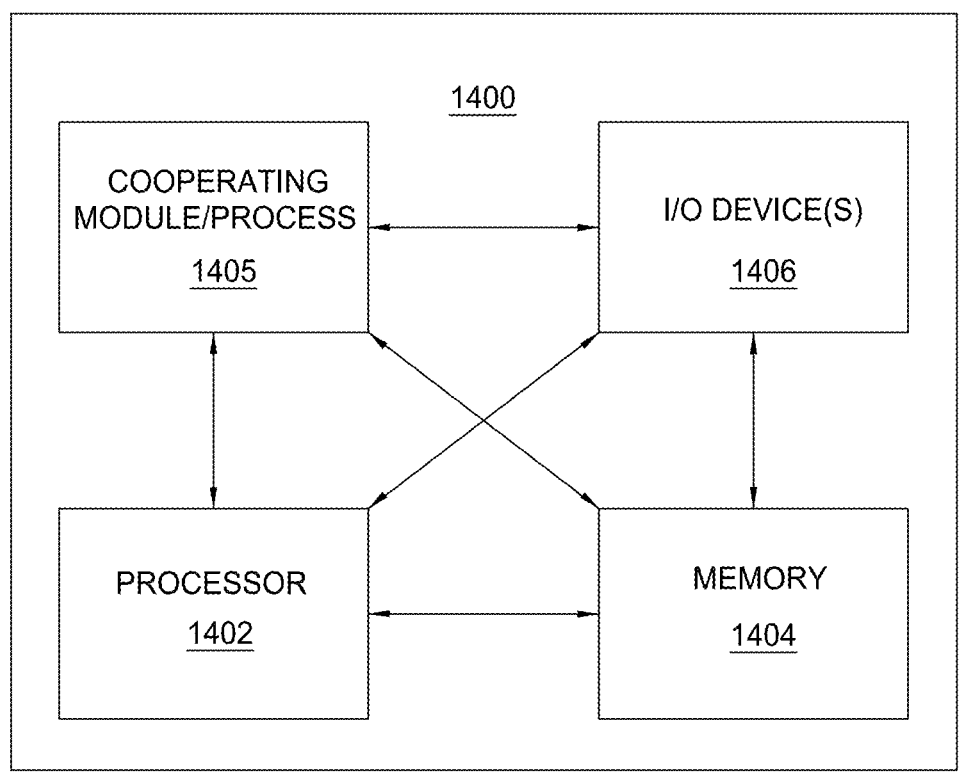
FIG. 14 depicts a high-level block diagram of a computer suitable for use in performing functions described herein.

FIG. 14 depicts a high-level block diagram of a computer suitable for use in performing functions described herein.

The computer 1400 includes a processor 1402 (e.g., a central processing unit (CPU) and/or other suitable processor(s)) and a memory 1404 (e.g., random access memory (RAM), read only memory (ROM), and the like).

The computer 1400 also may include a cooperating module/process 1405. The cooperating process 1405 can be loaded into memory 1404 and executed by the processor 1402 to implement functions as discussed herein and, thus, cooperating process 1405 (including associated data structures) can be stored on a computer readable storage medium, e.g., RAM memory, magnetic or optical drive or diskette, and the like.

The computer 1400 also may include one or more input/output devices 1406 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 1400 depicted in FIG. 14 provides a general architecture and functionality suitable for implementing functional elements described herein and/or portions of functional elements described herein. For example, the computer 1400 provides a general architecture and functionality suitable for providing one of the macro base stations $112_m$, a portion of one of the macro base stations $112_m$, one of the micro base stations $112_m$, a portion of one of the micro base stations $112_m$, mobility robustness controller 130, a portion of mobility robustness controller 130, or the like.

It will be appreciated that methods described herein may be performed, for example and without limitation, on a dedicated digital processor, a general purpose digital computer operating under appropriate software control, or the like. It will be appreciated that such processor may be situated at a node of a RAN (e.g., an eNodeB, a NodeB, or any other suitable type of base station or other suitable type of wireless access point), at a remote node that is communicatively connected to a base station(s), at a remote node that is not communicatively connected to a base station(s), or the like. It will be appreciated that multiple such processors may be deployed at any of these various locations.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that some of the method steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
determine, based on reference signal strength information associated with a wireless network, handover distance margin information associated with the wireless network; and
determine, for a set of handover parameters and based on the handover distance margin information associated with the wireless network, a respective set of handover parameter values configured to satisfy a target handover failure value,
wherein, to determine the handover parameter values, the processor is configured to:
determine speed information associated with the wireless network;
determine a handover time constraint value based on the handover distance margin information and the speed information, wherein, to determine the handover time constraint value based on the handover distance margin information and the speed information, the processor is configured to determine a handover distance margin value based on the handover distance margin information and the target handover failure value, determine a speed value from the speed information associated with the wireless network, and determine the handover time constraint value based on the handover distance margin value and the speed value; and
determine the handover parameter values based on the handover time constraint value.

2. The apparatus of claim 1, wherein the reference signal strength information associated with the wireless network comprises at least one of measured reference signal strength information, simulated reference signal strength information, or predicted reference signal strength information.

3. The apparatus of claim 1, wherein the handover distance margin information associated with the wireless network comprises a distance margin, wherein the distance margin comprises a distance between an ideal handover location and a defined failure location.

4. The apparatus of claim 1, wherein the handover distance margin information associated with the wireless network comprises at least one of information indicative of a handover distance margin distribution or information indicative of a handover distance margin map.

5. The apparatus of claim 1, wherein the speed information comprises at least one of speed information associated with a wireless user terminal, maximum speed information, or speed distribution information associated with at least one base station of the wireless network.

6. The apparatus of claim 1, wherein the speed information is speed information associated with a wireless user terminal, wherein the handover time constraint value is determined for the wireless user terminal, and wherein the handover parameter values are specific to the wireless user terminal.

7. The apparatus of claim 1, wherein, to determine the handover parameter values configured to satisfy the target handover failure value, the processor is configured to:
 determine constraints on the handover parameter values based on a combination of the set of handover parameters.

8. The apparatus of claim 1, wherein the handover distance margin information is associated with one wireless user terminal, a subset of wireless user terminals associated with one or more base stations, or all wireless user terminals associated with one or more base stations.

9. The apparatus of claim 1, wherein the processor is configured to:
 determine, based on the reference signal strength information associated with the wireless network, Signal-to-Interference-Noise (SINR) margin information associated with the wireless network.

10. The apparatus of claim 9, wherein the SINR margin information comprises at least one of an SINR margin distribution or an SINR margin map.

11. The apparatus of claim 9, wherein, to determine the SINR margin information associated with the wireless network, the processor is configured to:
 determine, based on the reference signal strength information associated with the wireless network, at least one cumulative distribution of a SINR map; and
 determine the SINR margin information based on the at least one cumulative distribution of the SINR map.

12. The apparatus of claim 9, wherein the processor is configured to:
 determine the handover parameter values based on the SINR margin information.

13. The apparatus of claim 12, wherein, to determine the handover parameter values, the processor is configured to:
 determine a handover time constraint value based on the handover distance margin information;
 determine an SINR margin value based on the SINR margin information; and
 determine the handover parameter values based on the handover time constraint value and the SINR margin value.

14. The apparatus of claim 1, wherein the set of handover parameters comprises at least one of a layer 3 filter parameter K, a Time to Trigger (TTT) parameter, a Hysteresis (Hys) parameter, or a cell individual offset parameter.

15. The apparatus of claim 14, wherein the set of handover parameters further comprises at least one of a cell specific offset parameter, a cell specific offset of a primary cell parameter, or a cell specific offset of a neighboring cell parameter.

16. The apparatus of claim 1, wherein the processor is configured to:
 determine, based on the reference signal strength information, at least one configuration action adapted to prevent a handover race condition.

17. The apparatus of claim 16, wherein the at least one configuration action adapted to prevent a handover race condition comprises a setting of one or more bias values of one or more cells of the wireless network.

18. The apparatus of claim 1, wherein the processor is configured to:
 determine, based on the reference signal strength information, whether a handover race condition is present.

19. The apparatus of claim 18, wherein, to determine whether a handover race condition is present, the processor is configured to:
 determine, for each of a plurality of locations associated with the reference signal strength information, whether at least one stable server is present at the respective location.

20. A non-transitory computer-readable storage medium storing instructions which, when executed by a computer, cause the computer to perform a method, the method comprising:
 determining, based on reference signal strength information associated with a wireless network, handover distance margin information associated with the wireless network; and
 determining, for a set of handover parameters and based on the handover distance margin information associated with the wireless network, a respective set of handover parameter values configured to satisfy a target handover failure value, wherein determining the handover parameter values comprises:
  determining speed information associated with the wireless network;
  determining a handover time constraint value based on the handover distance margin information and the speed information, wherein determining the handover time constraint value based on the handover distance margin information and the speed information comprises determining a handover distance margin value based on the handover distance margin information and the target handover failure value, determining a speed value from the speed information associated with the wireless network, and determining the handover time constraint value based on the handover distance margin value and the speed value; and
  determining the handover parameter values based on the handover time constraint value.

21. A method, comprising:
using a processor and a memory for:
 determining, based on reference signal strength information associated with a wireless network, handover distance margin information associated with the wireless network; and
 determining, for a set of handover parameters and based on the handover distance margin information associated with the wireless network, a respective set of handover parameter values configured to satisfy a target handover failure value, wherein determining the handover parameter values comprises:
  determining speed information associated with the wireless network;
  determining a handover time constraint value based on the handover distance margin information and the speed information, wherein determining the handover time constraint value based on the handover distance margin information and the speed information comprises determining a handover distance margin value based on the handover distance margin information and the target handover failure value, determining a speed value from the speed information associated with the wireless network, and determining the handover time constraint value based on the handover distance margin value and the speed value; and
determining the handover parameter values based on the handover time constraint value.

* * * * *